(12) United States Patent
Koori et al.

(10) Patent No.: US 10,844,205 B2
(45) Date of Patent: Nov. 24, 2020

(54) SPUNBONDED NON-WOVEN FABRIC AND METHOD FOR MANUFACTURING SAME

(71) Applicant: IDEMITSU KOSAN CO., LTD., Chiyoda-ku (JP)

(72) Inventors: Yohei Koori, Ichihara (JP); Tomoaki Takebe, Ichihara (JP); Yutaka Minami, Ichihara (JP); Takumi Sugiuchi, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 693 days.

(21) Appl. No.: 15/322,032

(22) PCT Filed: Jul. 3, 2015

(86) PCT No.: PCT/JP2015/069347
§ 371 (c)(1),
(2) Date: Dec. 23, 2016

(87) PCT Pub. No.: WO2016/002950
PCT Pub. Date: Jan. 7, 2016

(65) Prior Publication Data
US 2017/0145198 A1    May 25, 2017

(30) Foreign Application Priority Data
Jul. 3, 2014 (JP) ................................ 2014-138009

(51) Int. Cl.
C08L 23/12 (2006.01)
D04H 3/007 (2012.01)
D04H 3/14 (2012.01)
D04H 1/544 (2012.01)
D04H 1/4291 (2012.01)

(52) U.S. Cl.
CPC ............ *C08L 23/12* (2013.01); *D04H 1/4291* (2013.01); *D04H 1/544* (2013.01); *D04H 3/007* (2013.01); *D04H 3/14* (2013.01); *C08L 2203/12* (2013.01); *C08L 2205/025* (2013.01)

(58) Field of Classification Search
CPC ...... C08L 23/10; C08L 23/12; C08L 2203/12; C08L 2205/02; C09L 2205/025; D04H 1/544; D04H 1/4291; D04H 3/009; B32B 2262/0253; B32B 5/022; D01F 6/46; D01F 8/06; Y10T 442/681; Y10T 442/66
USPC .................................................. 442/382, 401
See application file for complete search history.

(56) References Cited

U.S. PATENT DOCUMENTS

| | | |
|---|---|---|
| 2005/0164587 A1 | 7/2005 | Melik et al. |
| 2005/0170727 A1 | 8/2005 | Melik et al. |
| 2008/0182940 A1 | 7/2008 | Raja et al. |
| 2010/0190405 A1 | 7/2010 | Takebe et al. |
| 2010/0330861 A1 | 12/2010 | Mor |
| 2012/0003894 A1 | 1/2012 | Sumiya et al. |
| 2012/0009837 A1 | 1/2012 | Mor |
| 2012/0116338 A1* | 5/2012 | Ferry ........................ B32B 5/26 604/372 |
| 2012/0208422 A1* | 8/2012 | Koori ...................... C08L 23/10 442/364 |
| 2012/0302982 A1 | 11/2012 | Takebe et al. |
| 2013/0099408 A1 | 4/2013 | Melik et al. |
| 2016/0251788 A1* | 9/2016 | Huang .................. D04H 1/4291 442/382 |
| 2017/0362397 A1 | 12/2017 | Mor |
| 2018/0209080 A1* | 7/2018 | Koori ................... D04H 1/4291 |

FOREIGN PATENT DOCUMENTS

| | | | |
|---|---|---|---|
| CN | 101688341 A | 3/2010 | |
| JP | 2009-062667 A | 3/2009 | |
| JP | 2010-516858 A | 5/2010 | |
| JP | 2013-237964 A | 11/2013 | |
| JP | 2015144991 A * | 8/2015 | |
| WO | WO 2011/030893 A1 | 3/2011 | |
| WO | WO 2011/090132 A1 | 7/2011 | |
| WO | WO 2014/042253 A1 | 3/2014 | |
| WO | WO 2014/142323 A1 | 9/2014 | |
| WO | WO-2015115449 A1 * | 8/2015 | ............ C09J 123/12 |

OTHER PUBLICATIONS

J-PlatPat translation of JP 2015144991, accessed on Apr. 22, 2019. (Year: 2015).*
Google Patent Translation of WO 2015115449, accessed on Apr. 22, 2019. (Year: 2015).*
Extended European Search Report dated Jan. 31, 2018 in corresponding European Patent Application No. 15815211.6, 7 pages.
Combined Chinese Office Action and Search Report dated Sep. 4, 2018 in Patent Application No. 201580035274.7 (with English language translation and English translation of categories of cited documents), 14 pages.

(Continued)

*Primary Examiner* — Marla D McConnell
*Assistant Examiner* — Christine X Nisula
(74) *Attorney, Agent, or Firm* — Oblon, McClelland, Maier & Neustadt, L.L.P.

(57) ABSTRACT

A nonwoven fabric formed of an olefin-based resin composition (I) containing an olefin-based polymer (i) satisfying specific requirements; a spunbond nonwoven fabric obtained by melt-extruding and molding the olefin-based resin composition (I) at a resin temperature of 220° C. or lower, and a method for producing it; a multilayer nonwoven fabric containing the spunbond nonwoven fabric; a nonwoven fabric and a multilayer nonwoven fabric including composite fibers containing an olefin-based resin composition (II) containing an olefin-based polymer (ii) satisfying specific requirements; and a fiber product using the spunbond nonwoven fabric, the nonwoven fabric of composite fibers, or the multilayer nonwoven fabric.

9 Claims, No Drawings

(56) References Cited

OTHER PUBLICATIONS

International Search Report dated Oct. 6, 2015, in PCT/JP2015/069347 filed Jul. 3, 2015.
Office Action as received in the corresponding Patent Application No. 15 815 211.6-1102 dated Aug. 31, 2020. 3 pages.

* cited by examiner

SPUNBONDED NON-WOVEN FABRIC AND METHOD FOR MANUFACTURING SAME

CROSS-REFERENCE TO RELATED APPLICATIONS

This application is a National Stage of PCT/JP2015/069347, which was filed on Jul. 3, 2015. This application is based upon and claims the benefit of priority to Japanese Application No. 2014-138009, which was filed on Jul. 3, 2014.

TECHNICAL FIELD

The present invention relates to a spunbond nonwoven fabric and a multilayer nonwoven fabric containing the nonwoven fabric, a method for producing them, a fiber product using the nonwoven fabric, a nonwoven fabric formed of composite fibers and a multilayer nonwoven fabric containing the nonwoven fabric formed of composite fibers, and a fiber product using the nonwoven fabric of composite fibers.

BACKGROUND ART

In recent years, polypropylene-based fibers and polypropylene nonwoven fabrics have been used in a variety of applications, including disposable diapers, sanitary products, hygienic products, clothing materials, bandages, and packing materials. Thus, in use thereof, in many cases, the fibers and the fabrics are brought into direct contact with bodies, and performance requirements relating to good wearability and smooth feel have become much increasing these days. Accordingly, regarding nonwoven fabrics, technical developments relating to improvement of feel for good wearability and reduction in basis weight for achieving lightweight products have been desired. For such performance improvements, optimization of the structure and the composition of fibers constituting nonwoven fabrics, spinning technique improvement, and flexibility improvement and strength enhancement of nonwoven fabrics are desired.

PTL 1 discloses a spunbond nonwoven fabric using a resin composition containing a low-crystalline polypropylene and a high-crystalline polypropylene, saying that it is possible to provide a polypropylene-based spunbond nonwoven fabric with good smooth feel or a polypropylene-based spunbond nonwoven fabric with high flexibility, which have an extremely small diameter and are free from thread breakage.

CITATION LIST

Patent Literature

PTL 1: WO2011/030893

SUMMARY OF INVENTION

Technical Problem

For satisfying the requirements for spunbond nonwoven fabrics for use for sanitary materials including disposable diapers, stable molten resin extrudability and spinnability are required from the viewpoint of moldability. Further, for such spunbond nonwoven fabrics, further improvement of uniformity of formation (texture, uniformity) is desired.

For stably extruding a molten resin, it is necessary to suitably control the resin pressure in a die, and in particular, it is necessary to set the resin temperature so that the pressure could not be too high. In addition, for realizing stable spinning, it is necessary to control the oriented crystallization of fibers and the spinning tension to be given to fibers on the spinning line.

For this, it is desirable to low the viscosity of a resin composition in a molten state, for example, by setting a high resin temperature in molding, or increasing the melt flow rate (MFR) of the resin composition to be used.

On the other hand, for uniformizing the formation of nonwoven fabrics, it is necessary to promote the oriented crystallization of the fibers constituting nonwoven fabrics to increase the stiffness thereof, and therefore it is desirable to set a low resin temperature in molding or to increase the melt viscosity of the resin composition to be used.

Accordingly, it has been difficult to satisfy both stable extrudability and spinnability of a molten resin and uniformization of the formation of a nonwoven fabric.

The present invention has been made in consideration of the above-mentioned situation and objects thereof are to provide a spunbond nonwoven fabric excellent in formation uniformity, to provide a production method of uniformly controlling the formation of a spunbond nonwoven fabric while maintaining stable melt extrudability and spinnability in molding a spunbond nonwoven fabric, and to provide a fiber product using the spunbond nonwoven fabric.

Solution to Problem

As a result of assiduous studies, the present inventors have found that when a specific olefin-based resin composition containing an olefin-based polymer satisfying specific requirements is molded through melt extrusion, the extrudability and the spinnability of the molten resin are stabilized, and have completed a first aspect of the present invention.

Also, the present inventors have found that, in the first aspect of the invention, when the olefin-based resin composition is melt-extruded at a specific resin composition, uniformization of the formation of the spunbond nonwoven fabric can be attained, and have found a second aspect of the invention.

Also, the present inventors have found that the spinnability of a nonwoven fabric containing composite fibers containing two kinds of olefin-based resin compositions satisfying specific requirements is also stabilized, therefore realizing uniformity of the formation of the nonwoven fabric, and more uniformity of the formation of a multilayer nonwoven fabric containing the nonwoven fabric including composite fibers, and have completed a third aspect of the present invention.

The present invention have been made on the basis of these findings.

Specifically, the present invention provides of the following inventions:

[1] A spunbond nonwoven fabric formed of an olefin-based resin composition (I) containing an olefin-based polymer (i) satisfying the following requirements (a) and (b):

(a) the melt flow rate (MFR) of the olefin-based polymer (i), as measured under the condition of a temperature of 230° C. and a load of 21.18 N, is 1,000 g/10 min or more; and (b) the melting endothermic amount $\Delta H\text{-}D$, as measured from the melting endothermic curve drawn by keeping the olefin-based polymer (i) at $-10°$ C. in a nitrogen atmosphere for 5 minutes and then heating it at 10° C./min in a nitrogen atmosphere using a differential scanning calorimeter (DSC), is less than 80 J/g.

[2] A spunbond nonwoven fabric obtained by melt-extruding an olefin-based resin composition (I) containing an olefin-based polymer (i) satisfying the following requirements (a) and (b), at a resin temperature of 220° C. or lower and mold the resultant into a spunbond nonwoven fabric:

(a) the melt flow rate (MFR) of the olefin-based polymer (i), as measured under the condition of a temperature of 230° C. and a load of 21.18 N, is 1,000 g/10 min or more; and (b) the melting endothermic amount ΔH–D, as measured from the melting endothermic curve drawn by keeping the olefin-based polymer (i) at –10° C. in a nitrogen atmosphere for 5 minutes and then heating it at 10° C./min in a nitrogen atmosphere using a differential scanning calorimeter (DSC), is less than 80 J/g.

[3] The spunbond nonwoven fabric according to the above [1] or [2], wherein satisfies the following requirement (1):

(1) the melt flow rate (MFR) of the olefin-based resin composition (I), as measured under the condition of a temperature of 230° C. and a load of 21.18 N, is 40 g/10 min or more.

[4] The spunbond nonwoven fabric according to any of the above [1] to [3], wherein the olefin-based resin composition (I) further satisfies the following requirement (2):

(2) the melting endothermic amount ΔH–D, as measured from the melting endothermic curve drawn by keeping the olefin-based resin composition (I) at –10° C. in a nitrogen atmosphere for 5 minutes and then heating it at 10° C./min in a nitrogen atmosphere using a differential scanning calorimeter (DSC), is less than 90 J/g.

[5] The spunbond nonwoven fabric according to any of the above [1] to [4], wherein the content of the olefin-based polymer (i) in the olefin resin composition (I) is 1 to 50% by mass relative to the total amount, 100% by mass of the olefin resin composition (I).

[6] The spunbond nonwoven fabric according to any of the above [1] to [5], wherein the olefin polymer (i) is a propylene polymer (ip) and satisfies the following requirements (c) and (d):

(c) the mesopentad fraction [mmmm] thereof is 20 to 60 mol %; and (d) [rrrr]/(1–[mmmm])≤0.1.

[7] The spunbond nonwoven fabric according to any of the above [1] to [6], wherein the olefin-based resin composition (I) is a propylene-based resin composition (IP).

[8] A multilayer nonwoven fabric formed by layering two or more nonwoven fabric layers, wherein at least one nonwoven fabric layer constituting the multilayer nonwoven fabric is the spunbond nonwoven fabric of any of the above [1] to [7].

[9] A method for producing a spunbond nonwoven fabric, including a step of melt-extruding an olefin resin composition (I) containing an olefin-based polymer (i) satisfying the following requirements (a) and (b) at a resin temperature of 220° C. or lower:

(a) the melt flow rate (MFR) of the olefin-based polymer (i), as measured under the condition of a temperature of 230° C. and a load of 21.18 N, is 1,000 g/10 min or more; and (b) the melting endothermic amount ΔH–D, as measured from the melting endothermic curve drawn by keeping the olefin polymer (i) at –10° C. in a nitrogen atmosphere for 5 minutes and then heating it at 10° C./min in a nitrogen atmosphere using a differential scanning calorimeter (DSC), is less than 80 J/g.

[10] The method for producing a spunbond nonwoven fabric according to the above [9], wherein the olefin-based resin composition (I) satisfies the following requirement (1):

(1) the melt flow rate (MFR) of the olefin-based resin composition (I), as measured under the condition of a temperature of 230° C. and a load of 21.18 N, is 40 g/10 min or more.

[11] A nonwoven fabric formed of composite fibers containing the following first component and second component:

first component: an olefin-based resin composition (I) containing an olefin-based polymer (i) satisfying the following requirements (a) and (b):

(a) the melt flow rate (MFR) of the olefin-based polymer (i), as measured under the condition of a temperature of 230° C. and a load of 21.18 N, is 1,000 g/10 min or more; and (b) the melting endothermic amount ΔH–D, as measured from the melting endothermic curve drawn by keeping the olefin-based polymer (i) at –10° C. in a nitrogen atmosphere for 5 minutes and then heating it at 10° C./min in a nitrogen atmosphere using a differential scanning calorimeter (DSC), is less than 80 J/g, and second component: an olefin-based resin composition (II) containing an olefin-based polymer (ii) satisfying the following requirements (e) and (f):

(e) the melt flow rate (MFR) of the olefin-based polymer (ii), as measured under the condition of a temperature of 230° C. and a load of 21.18 N, is 1 g/10 min or more and 100 g/10 min or less; and (f) the melting point (Tm–D) of the olefin-based polymer (ii), as defined as a peak top of a peak observed on the highest temperature side of the melting endothermic curve drawn by keeping the composition at –10° C. in a nitrogen atmosphere for 5 minutes and then heating it at 10° C./min in a nitrogen atmosphere using a differential scanning calorimeter (DSC), is higher than 120° C.

[12] The nonwoven fabric formed of composite fibers according to the above [11], wherein the content of the olefin-based polymer (i) in the olefin-based resin composition (I) is 1 to 50% by mass relative to the total amount, 100% by mass of the olefin-based resin composition (I).

[13] The nonwoven fabric formed of composite fibers according to the above [11] or [12], wherein the composite fibers are at least one kind selected from a core-sheath type fiber, a side-by-side type fiber and an eccentric core-sheath type fiber.

[14] A multilayer nonwoven fabric formed by layering two or more nonwoven fabric layers, wherein at least one nonwoven fabric layer constituting the multilayer nonwoven fabric is the nonwoven fabric formed of composite fibers according to any of the above [11] to [13].

[15] The multilayer nonwoven fabric according to the above [14], wherein at least one nonwoven fabric layer constituting the multilayer nonwoven fabric is a melt-blown nonwoven fabric.

[16] A fiber product using the spunbond nonwoven fabric of any of the above [1] to [7], the nonwoven fabric formed of composite fibers of any of the above [11] to [13], or the multilayer nonwoven fabric of any of the above [8], [14] or [15].

Advantageous Effects of Invention

According to the present invention, there can be provided a production method capable of uniformly controlling the formation of a spunbond nonwoven fabric while maintaining stable melt extrudability and spinnability in production of a spunbond nonwoven fabric, as well as a spunbond nonwoven fabric excellent in formation uniformity and a multilayer nonwoven fabric containing the spunbond nonwoven fabric. In addition, the spunbond nonwoven fabric is excellent in formation uniformity and has a good feel, and therefore, for example, there can be provided fiber products such as disposable diapers, sanitary products, hygiene products and the like using the spunbond nonwoven fabric and the multilayer nonwoven fabric.

DESCRIPTION OF EMBODIMENTS

<<First Aspect and Second Aspect of Invention>>
[Spunbond Nonwoven Fabric]

The spunbond nonwoven fabric of the first aspect of the present invention is formed of an olefin-based resin composition (I) containing an olefin-based polymer (i) satisfying the following requirements (a) and (b):

(a) the melt flow rate (hereinafter this may be simply referred to as "MFR") thereof, as measured under the condition of a temperature of 230° C. and a load of 21.18 N, is 1,000 g/10 min or more; and (b) the melting endothermic amount ΔH–D, as measured from the melting endothermic curve drawn by keeping the composition at −10° C. in a nitrogen atmosphere for 5 minutes and then heating it at 10° C./min in a nitrogen atmosphere using a differential scanning calorimeter (DSC), is less than 80 J/g.

The spunbond nonwoven fabric of the second aspect of the present invention is obtained by melt-extruding and molding an olefin-based resin composition (I) containing an olefin-based polymer (i) satisfying the following requirements (a) and (b), at a resin temperature of 220° C. or lower:

(a) the melt flow rate (MFR) thereof, as measured under the condition of a temperature of 230° C. and a load of 21.18 N, is 1,000 g/10 min or more; and (b) the melting endothermic amount ΔH–D, as measured from the melting endothermic curve drawn by keeping the composition at −10° C. in a nitrogen atmosphere for 5 minutes and then heating it at 10° C./min n a nitrogen atmosphere using a differential scanning calorimeter (DSC), is less than 80 J/g.

When the resin temperature of the olefin-based resin composition (I) in melt extrusion is lower than 220° C., a crystallization on the spinning line becomes fast, and therefore the stiffness of the fibers increases and a spunbond nonwoven fabric having a high formation uniformity is easy to obtain.

From such a viewpoint, the resin temperature of the olefin-based resin composition (I) in melt extrusion is preferably 215° C. or lower, more preferably 210° C. or lower. The lower limit of the resin temperature is not specifically defined, but is, in general, not lower than the melting point of the olefin-based resin composition (I), preferably 180° C. or higher, more preferably 190° C. or higher.

In this description, "resin temperature" means the temperature at the resin extruding port of the extruder used.

The constituent components and the production methods for the spunbond nonwoven fabric of the first aspect of the present invention and the spunbond nonwoven fabric of the second aspect of the present invention are described sequentially. The requirements (a) and (b) similarly apply to all the spunbond nonwoven fabric of the first aspect of the present invention and the spunbond nonwoven fabric of the second aspect of the present invention and the nonwoven fabric formed of composite fibers of the third aspect of the present invention to be mentioned hereinunder, and the preferred conditions thereof also apply unless otherwise specifically indicated. The olefin-based polymer (i), the olefin-based resin composition (I) and the constituent components to be mentioned below are components that are to be similarly used for the spunbond nonwoven fabric of the first aspect of the present invention and the spunbond nonwoven fabric of the second aspect of the present invention and for the nonwoven fabric formed of composite fibers of the third aspect of the present invention to be mentioned hereinunder, and the preferred embodiments thereof are also the same unless otherwise specifically indicated.

In this description, the mere expression "the present invention" indicates all the first aspect of the invention, the second aspect of the invention and the third aspect of the invention.

<Olefin-Based Polymer (i)>

The olefin-based polymer (i) for use in the present invention satisfies the following requirements (a) and (b). The following requirements (a) and (b) may be controlled by catalyst selection and reaction condition in producing the olefin-based polymer (i). The same may apply to the requirements (c) and (d). Hereinunder in this description, the mere expression of olefin-based polymer (i) indicates the olefin polymer satisfying the following requirements (a) and (b) for use in the present invention.

(a) The melt flow rate (MFR) of the polymer, as measured under the condition of a temperature of 230° C. and a load of 21.18 N, is 1,000 g/10 min or more.

When MFR of the olefin-based polymer (i), as measured under the condition of a temperature of 230° C. and a load of 21.18 N, is less than 1,000 g/10 min, the spinnability of the olefin-based resin composition in melt extrusion is poor and it becomes difficult to continuously obtain a spunbond nonwoven fabric having high formation uniformity. In particular, in the case where the resin temperature of the olefin resin composition (I) in melt extrusion is 220° C. or lower, the the pressure in melt extrusion becomes unstable and stable spinning could not be carried out, and therefore, it becomes more difficult to continuously obtain a spunbond nonwoven fabric having high formation uniformity. However, when the olefin-based polymer (i) satisfies the requirement (a), it becomes possible to continuously obtain a spunbond nonwoven fabric having high formation uniformity.

From this viewpoint, MFR of the olefin-based polymer (i) is preferably 1,500 g/10 min or more, more preferably 1,800 g/10 min or more, even more preferably 2,000 g/10 min or more.

The melt flow rate (MFR) is a value measured according to the measurement method described in the section of Examples to be given hereinunder.

(b) The melting endothermic amount ΔH–D of the polymer, as measured from the melting endothermic curve drawn by keeping the composition at −10° C. in a nitrogen atmosphere for 5 minutes and then heating it at 10° C./min in a nitrogen atmosphere using a differential scanning calorimeter (DSC), is less than 80 J/g.

When the melting endothermic amount ΔH–D of the olefin-based polymer (i) is 80 J/g or more, it is impossible to prevent thread breakage of fibers in melt extrusion of the olefin resin-based composition (I), and the spinnability is unstable, and therefore it becomes difficult to obtain a spunbond nonwoven fabric having high formation uniformity. From this viewpoint, the melting endothermic amount ΔH–D is preferably 70 J/g or less, more preferably 60 J/g or less.

The olefin-based polymer (i) is preferably a propylene-based polymer, and more preferably a propylene-based polymer (ip) satisfying the following requirements (c) and (d). Hereinunder in this description, the mere expression of propylene-based polymer (ip) indicates the propylene resin satisfying the above requirements (a) and (b), and the following requirements (c) and (d) for use in the present invention.

The propylene-based resin not satisfying the requirements includes, though not specifically limited, any other polypropylene and the like to be mentioned hereinunder.

(c) The mesopentad fraction [mmmm] of the polymer is 20 to 60 mol %;

When the mesopentad fraction [mmmm] is 20 mol % or more, the melt extrudability of the olefin-based resin composition (I) and the spinnability in using the resin composition (I) can be stabilized therefore realizing conformation uniformity. When the mesopentad fraction [mmmm] is 60 mol % or less, the nonwoven fabric formed of the resin composition can be flexible and can realize formation uniformity. From these viewpoints, the mesopentad fraction [mmmm] is preferably 30 mol % or more and 60 mol % or less, more preferably 40 mol % or more and 60 mol % or less, even more preferably 40 mol % or more and 55 mol % or less.

(d) [rrrr]/(1−[mmmm])≤0.1

The value [rrrr]/(1−[mmmm]) is an indicator showing the uniformity of the regularity distribution of the propylene-based polymer. When [rrrr]/(1−[mmmm]) of the propylene-based polymer is 0.1 or less, the regularity distribution becomes narrow, and a mixture of a high-stereoregularity polypropylene and an atactic polypropylene, as in the case of a conventional polypropylene produced in the presence of an existing catalyst system to cause stickiness, can be prevented from being formed. From this viewpoint, [rrrr]/(1−[mmmm]) is preferably 0.05 or less, more preferably 0.04 or less.

The stereoregularity of the above (c) and (d) is determined by NMR.

In the present invention, the mesopentad fraction [mmmm] and the racemic pentad fraction [rrrr] are measured in conformity with the method proposed by A. Zambelli, et al., "Macromolecules, 6, 925 (1973)" and are a meso fraction and a racemic fraction, respectively, in the pentad units of the polypropylene molecular chain that are measured based on a signal of the methyl group in the $^{13}$C-NMR spectrum. As the mesopentad fraction [mmmm] increases, the stereoregularity increases.

The measurement of the $^{13}$C-NMR spectrum in this description was performed by a method described in the section of Examples.

The propylene-based polymer (ip) may be either a propylene homopolymer or a copolymer. In the case of a copolymer, a copolymerization ratio of the propylene unit is 50 mol % or more, preferably 60 mol % or more, and more preferably 70 mol % or more. Examples of the copolymerizable monomer include α-olefins having 2 or 4 to 20 carbon atoms, such as ethylene, 1-butene, 1-pentene, 1-hexene, 1-octene, 1-decene, etc., acrylic esters, such as methyl acrylate, etc., vinyl acetate, and the like. From the viewpoint of moldability, a propylene homopolymer is preferred. One alone or two or more kinds of these polymers may be used either singly or as combined.

The above-described propylene-based polymer (ip) can be produced using a metallocene-based catalyst as described in, for example, WO 2003/087172. In particular, a metallocene-based catalyst using a transition metal compound in which a ligand forms a crosslinked structure via a crosslinking group is preferred. Above all, a metallocene-based catalyst obtained by combining a transition metal compound in which a crosslinked structure is formed via two crosslinking groups with a cocatalyst is preferred.

Specifically, examples thereof include a polymerization catalyst containing (A) a transition metal compound represented by the following general formula (I) and (B) a cocatalyst component selected from (B-1) a compound capable of reacting with the transition metal compound that is the component (A) or a derivative thereof to form an ionic complex and (B-2) an aluminoxane.

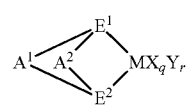

(I)

Wherein, In the formula, M represents a metal element belonging to any one of the Groups 3 to 10 or the lanthanoid series in the periodic table; each of $E^1$ and $E^2$ represents a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group, and a silicon-containing group, and forms a crosslinked structure via $A^1$ and $A^2$, and may be the same as or different from each other; X represents a σ-bonding ligand, and when a plurality of Xs are present, the plurality of Xs may be the same as or different from each other, and each X may crosslink with any other X, $E^1$, $E^2$, or Y; Y represents a Lewis base, and when a plurality of Ys are present, the plurality of Ys may be the same as or different from each other, and each Y may crosslink with any other Y, $E^1$, $E^2$, or X; each of $A^1$ and $A^2$ represents a divalent crosslinking group that bonds two ligands and represents a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$—, or —AlR$^1$—, wherein R$^1$ represents a hydrogen atom, a halogen atom, a hydrocarbon group having 1 to 20 carbon atoms, or a halogen-containing hydrocarbon group having 1 to 20 carbon atoms, and may be the same as or different from each other; q represents an integer of 1 to 5 and corresponds to [(valence of M)−2]; and r represents an integer of 0 to 3.

The transition metal compound that is the above-described component (A) is preferably a transition metal compound in which the ligand is of a (1,2')(2,1') double crosslinking type, and examples thereof include (1,2'-dimethylsilylene)(2,1'-dimethylsilylene)-bis(3-trimethylsilylmethylindenyl)zirconium dichloride.

As specific examples of the compound that is the above-described component (B-1) of the component (B), there may be exemplified triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis (pentafluorophenyl)borate, tri-n-butylammonium tetrakis(pentafluorophenyl)borate, triphenylammonium tetrakis (pentafluorophenyl)borate, tetra-n-butylammonium tetrakis (pentafluorophenyl)borate, tetraethylammonium tetrakis (pentafluorophenyl)borate, benzyl(tri-n-butylammonium tetrakis(pentafluorophenyl)borate, methyldiphenylammonium tetrakis(pentafluorophenyl)borate, triphenyl(methylammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl (2-cyanopyridinium) tetrakis(pentafluorophenyl)borate, methyl(4-cyanopyridinium) tetrakis(pentafluorophenyl)borate, triphenylphosphonium tetrakis(pentafluorophenyl)borate, dimethylanilinium tetrakis[bis(3,5-ditrifluoromethyl) phenyl]borate, ferrocenium tetraphenylborate, silver tetraphenylborate, trityl tetraphenylborate, tetraphenylporphyrinmanganese tetraphenylborate, ferrocenium tetrakis (pentafluorophenyl)borate, (1,1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis (pentafluorophenyl)borate, tetraphenylporphyrinmanganese tetrakis(pentafluorophenyl)borate, silver tetrafluoroborate, silver hexafluorophosphate, silver hexafluoroarsenate, silver perchlorate, silver trifluoroaceate, silver trifluoromethanesulfonate, and the like.

One alone or two or more kinds of (B-1) may be used either singly or as combined.

Examples of the aluminoxane that is the above-described component (B-2) include known chain aluminoxanes and cyclic aluminoxanes. One alone or two or more kinds of these aluminoxanes may be used either singly or as combined. Also one or more of the above component (B-1) and one or more of the above component (B-2) may be combined.

As the metallocene-based catalyst, an organic aluminum compound may be used as a component (C) as combined with the component (A) and the component (B) for producing the propylene-based polymer.

The organic aluminum compound for the component (C) includes trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, ethylaluminum sesquichloride, etc. One alone or two or more kinds of these organic aluminum compounds may be used either singly or as combined. In polymerization of propylene, at least one catalyst component can be held by a suitable carrier.

The polymerization method is not specifically limited, and any method of a slurry polymerization method, a vapor-phase polymerization method, a bulk polymerization method, a solution polymerization method, a suspension polymerization method or the like may be used. A bulk polymerization method and a solution polymerization method are especially preferred. The polymerization temperature is generally −100 to 250° C., and the ratio of the catalyst to be used relative to the reactant is preferably such that reactant monomer/component (A) (molar ratio) is 1 to $10^8$, more preferably 100 to $10^5$. The polymerization time is generally 5 minutes to 10 hours, and the reaction pressure is generally ordinary pressure to 20 MPa (gauge).

(Other Polypropylene)

The other polypropylene that may be used in the first aspect and the second aspect of the present invention is one having MFR, as measured at a temperature of 230° C. and under a load of 21.18 N, is 1 g/10 min or more and less than 1,000 g/10 min, preferably 10 g/10 min or more and 700 g/10 min or less, more preferably 15 g/10 min or more and 500 g/10 min or less, even more preferably 18 g/10 min or more and 100 g/10 min or less.

The melt flow rate (MFR) is a value measured according to the measurement method stipulated in JIS K7210, using an extrusion-type plastometer defined in JIS K6760.

The other polypropylene that may be used in the first aspect and the second aspect of the present invention is not particularly limited so long as its melting point (Tm–D) defined as a peak top of a peak observed on the highest temperature side of the melting endothermic curve obtained by holding under a nitrogen atmosphere at −10° C. for 5 minutes and then increasing the temperature at a rate of 10° C./min under a nitrogen atmosphere by using a differential scanning calorimeter (DSC) exceeds 120° C. High-crystalline polypropylenes such as PP3155 (trade name, manufactured by ExxonMobil Chemical), Y2005GP (trade name, manufactured by Prime Polymer Co., Ltd.), Prime Polypro™ S119 (trade name, manufactured by Prime Polymer Co., Ltd.), NOVATEC-SA03 (trade name, manufactured by Japan Polypropylene Corporation) and the like may be used.

The other polypropylene may be either a propylene homopolymer or a copolymer. In the case of a copolymer, the copolymerization ratio of the propylene unit is 50 mol % or more, preferably 60 mol % or more, more preferably 70 mol % or more, still more preferably 90 mol % or more, and still even more preferably 95 mol % or more. Examples of copolymerizable monomers include oc-olefins having 2 or 4 to 20 carbon atoms, such as ethylene, 1-butene, 1-pentene, 1-hexene, 1-octene, 1-decene, etc., acrylic esters, such as methyl acrylate, etc., vinyl acetate, and the like. From the viewpoint of moldability, a propylene homopolymer is preferred. One alone or two or more kinds of such polymers may be used either singly or as combined.

As the other polypropylene, one having a melting point (Tm–D), defined as a peak top of a peak observed on the highest temperature side of the melting endothermic curve obtained by holding under a nitrogen atmosphere at −10° C. for 5 minutes and then increasing the temperature at a rate of 10° C./min under a nitrogen atmosphere by using a differential scanning calorimeter (DSC), of higher than 120° C. and 170° C. or lower is preferred, and one having the melting point of 125 to 167° C. is more preferred.

<Olefin-Based Resin Composition (I)>

The olefin-based resin composition (I) for use in the present invention contains the olefin-based polymer (i) satisfying the above-mentioned requirements (a) and (b). Hereinunder in this description, the mere expression of olefin-based resin composition (I) indicates the olefin-based resin composition that contains the olefin-based polymer (i) satisfying the requirements (a) and (b) for use in the present invention.

The content of the olefin-based polymer (i) in the olefin-based resin composition (I) is, relative to the total amount 100% by mass of the olefin-based resin composition (I), preferably 1 to 50% by mass, more preferably 3 to 40% by mass, even more preferably 5 to 30% by mass.

Preferably, the olefin-based resin composition (I) satisfies the following requirement (1), more preferably, additionally satisfying the following requirement (2).

(1) The melt flow rate (MFR) of the composition, as measured under the condition of a temperature of 230° C. and a load of 21.18 N, is 40 g/10 min or more.

Regarding the olefin-based resin composition (I) for use in the present invention, preferably, MFR, as measured under the condition of a temperature of 230° C. and a load of 21.18 N, is 40 g/10 min or more.

When MFR of the olefin-based resin composition (I) is 40 g/10 min or more, the die pressure could still be stable and the spinnability could also be stable even though the composition is extruded at a resin temperature of 220° C. or lower in melt extrusion, and therefore a spunbond nonwoven fabric having higher formation uniformity could be obtained.

From this viewpoint, MFR of the olefin-based resin composition (I) is more preferably 45 g/10 min or more, even more preferably 48 g/10 min or more.

(2) The melting endothermic amount ΔH–D of the composition, as measured from the melting endothermic curve drawn by keeping the composition at −10° C. in a nitrogen atmosphere for 5 minutes and then heating it at 10° C./min in a nitrogen atmosphere using a differential scanning calorimeter (DSC), is less than 90 J/g.

When the melting endothermic amount ΔH–D of the olefin-based resin composition (I) is less than 90 J/g, the the pressure could be stable and the spinnability could also be stable, and therefore a spunbond nonwoven fabric having higher formation uniformity could be obtained. From this viewpoint, the melting endothermic amount ΔH–D is more preferably 86 J/g or less, even more preferably 81 J/g or less.

The melting endotherm ΔH–D is calculated in a manner in which when a line connecting a point on the low-temperature side free from a change in the amount of heat with a point on the high-temperature side free from a change in the amount of heat is defined as a baseline, and an area surrounded by a line portion including the peak of the melting endothermic curve obtained by the DSC measurement and the baseline is determined.

The olefin-based resin composition (I) is preferably a propylene-based resin composition (IP). In this description, the propylene-based resin composition (IP) means an olefin-based resin composition in which the proportion of the propylene-based polymer (ip) and the other polypropylene in the olefin-based resin composition (I) is 50% by mass or more.

The proportion of the propylene-based polymer (ip) and the other polypropylene in the olefin-based resin composition (I) is preferably 70% by mass or more, more preferably 80% by mass or more, even more preferably 90% by mass or more, still even more preferably 95% by mass or more.

Hereinunder in this description, the mere expression of propylene-based resin composition (IP) indicates a propylene-based resin composition that contains the olefin-based polymer (i) satisfying the above-mentioned requirements (a) and (b) for use in the present invention.

The olefin-based resin composition (I) may contain various additives such as any other thermoplastic resin, release agent and the like, within a range not detracting from the advantageous effects of the first aspect and the second aspect of the present invention.

The other thermoplastic resin includes other olefin polymers than the above-mentioned olefin-based polymer (i), concretely polypropylene, propylene-ethylene copolymer, propylene-ethylene-diene copolymer, polyethylene, ethylene/α-olefin copolymer, ethylene-vinyl acetate copolymer, hydrogenated styrene elastomer, etc. Polyester, polyamide, polylactic acid and the like are also included. One alone or two or more kinds of these may be used either singly or as combined.

The release agent is an additive for enhancing releasability in order that the molded nonwoven fabric would not adhere to the roll, the conveyor and the like of the molding machine. The release agent that is contained in the resin composition is referred to as an internal release agent, and the internal release agent is an additive to be added to the resin material for enhancing the releasability of the nonwoven fabric formed. An external release agent is an additive that is directly applied to the roll or the conveyor of a molding machine for enhancing the releasability of the nonwoven fabric formed.

The internal release agent includes organic carboxylic acids and metal salts thereof, aromatic sulfonic acids and metal salts thereof, organic phosphoric acid compounds and metal salts thereof, dibenzylidene sorbitol and derivatives thereof, rosin acid partial metal salts, inorganic fine particles, imide acids, amide acids, quinacridons, quinones, and mixtures thereof.

The metal in the metal salts of organic carboxylic acids include Li, Ca, Ba, Zn, Mg, Al, Pb, etc. The carboxylic acid includes fatty acids such as octylic acid, palmitic acid, lauric acid, stearic acid, behenic acid, montanic acid, 12-hydroxystearic acid, oleic acid, isostearic acid, ricinoleic acid, etc., and aromatic carboxylic acids such as benzoic acid, p-t-butyl-benzoic acid, etc. Specific examples of the salts include aluminum benzoate, aluminum p-t-butylbenzoate, sodium adipate, sodium thiophenecarboxylate, sodium pyrrolecarboxylate, etc.

Examples of dibenzylidene sorbitol and its derivatives include dibenzylidene sorbitol, 1,3:2,4-bis(o-3,4-dimethylbenzylidene)sorbitol, 1,3:2,4-bis(o-2,4-dimethylbenzylidene)sorbitol, 1,3:2,4-bis(o-4-ethylbenzylidene)sorbitol, 1,3:2,4-bis(o-4-chlorobenzylidene)sorbitol, 1,3:2,4-dibenzylidene sorbitol, etc. Examples of commercially available products thereof include GEL ALL MD and GEL ALL MD-R, all of which are manufactured by New Japan Chemical Co., Ltd., etc.

Examples of the rosin acid partial metal salt include PINECRYSTAL KM1600, PINECRYSTAL KM1500, and PINECRYSTAL KM1300, all of which are manufactured by Arakawa Chemical Industries, Ltd., etc.

Examples of the inorganic fine particles include talc, clay, mica, asbestos, glass fiber, glass flake, glass bead, calcium silicate, montmorillonite, bentonite, graphite, aluminum powder, alumina, silica, diatomaceous earth, titanium oxide, magnesium oxide, pumice powder, pumice balloon, aluminum hydroxide, magnesium hydroxide, basic magnesium carbonate, dolomite, calcium sulfate, potassium titanate, barium sulfate, calcium sulfite, molybdenum sulfide, etc. Examples of commercially available products thereof include SYLYSIA, manufactured by Fuji Silysia Chemical Ltd., MIZUKASIL, manufactured by Mizusawa Industrial Chemicals, Ltd., etc.

The amide compound includes erucamide, oleamide, stearamide, behenamide, ethylenebisstearamide, ethylenebisoleamide, stearylerucamide, oelylpalmitamide, adipic dianilide, suberic dianilide, etc.

Examples of the organic phosphoric acid compound include trimethyl phosphate, triethyl phosphate, tributyl phosphate, 2-ethylhexyl phosphate, butoxyethyl phosphate, triphenyl phosphate, tricresyl phosphate, trixylenyl phosphate, cresykliphenyl phosphate, 2-ethylhexyldiphenyl phosphate, cresykli-2,6-xylenyl phosphate, resorcinoldiphenol phosphate, various aromatic condensed phosphate esters, 2-chloroethyl phosphate, chloropropyl phosphate, dichloropropyl phosphate, tribromoneopentyl phosphate, halogen-containing condensed phosphoric acid, bis-2-ethylhexyl phosphate, diisodecyl phosphate, 2-methacryloyloxyethyl acid phosphate, diphenyl-2-methacryloyloxyethyl phosphate, methyl acid phosphate, butyl acid phosphate, monoisodecyl phosphate, 2-butylhexyl acid phosphate, isodecyl acid phosphate, triphenyl phosphate, dibutyl hydrogen phosphate, polyoxyethylene lauryl ether phosphoric acid, polyoxyalkyl ether phosphoric acid, polyoxyethylene alkyl phenyl ether phosphoric acid, polyoxyethylene dialkyl phenyl ether phosphoric acid, etc.; and examples of the metal salt of organic phosphoric acid compound include salts of Li, Ca, Ba, Zn, Mg, Al, Pb or the like of the above-described organic phosphoric acid compounds. Examples of commercially available products thereof include ADEKA STAB NA-11 and ADEKA STAB NA-21, all of which are manufactured by ADEKA Corporation, etc.

These internal release agents may be used solely or in combination of two or more kinds thereof. In the present invention, among these internal release agents, one selected from erucamide, clibenzylidene sorbitol, 1,3:2,4-bis(o-3,4-dimethylbenzylidene)sorbitol, 1,3:2,4-bis(o-2,4-dimethylbenzylidene)sorbitol, 1,3:2,4-bis(o-4-ethylbenzylidene)sorbitol, 1,3:2,4-bis(o-4-chlorobenzylidene)sorbitol and 1,3:2,4-dibenzylidene sorbitol is preferred.

The content of the internal release agent in the olefin resin composition (I) is preferably 10 to 10,000 ppm by mass, more preferably 100 to 5,000 ppm by mass on the basis of the resin composition excluding the additive. When the content of the internal release agent is 10 ppm by mass or more, the function as the release agent is revealed, whereas when it is 10,000 ppm by mass or less, the balance between the function of the release agent and the economic potential thereof is good.

As other various additives than the internal release agent, any conventional known additive may be incorporated in the resin composition. Examples of the other additives include a foaming agent, a crystal nucleating agent, a weatherability stabilizer, a UV absorber, a light stabilizer, a heat resistance stabilizer, an antistatic agent, a flame retardant, a synthetic oil, a wax, an electric property-improving agent, a slip inhibitor, an anti-blocking agent, a viscosity-controlling agent, a coloring inhibitor, a defogging agent, a lubricant, a pigment, a dye, a plasticizer, a softening agent, an age resistor, a hydrochloric acid-absorbing agent, a chlorine scavenger, an antioxidant, an antitack agent, etc.

<Uniformity of Formation>

The spunbond nonwoven fabric of the first aspect and the second aspect of the present invention is a spunbond nonwoven fabric having a uniformity of formation of preferably 3.0 or less. The uniformity of formation is a value to be calculated according to the method described in the section of Examples give hereinunder. When the uniformity of formation is 3.0 or less, the spunbond nonwoven fabric may have excellent design performance and excellent feeling, and can be favorably used for sanitary materials including disposable diapers.

[Multilayer Nonwoven Fabric]

The multilayer nonwoven fabric of the first aspect and the second aspect of the present invention is a multilayer nonwoven fabric formed by layering two or more nonwoven fabric layers, and at least one nonwoven fabric layer constituting the multilayer nonwoven fabric may be the above-mentioned spunbond nonwoven fabric of the present invention. The multilayer nonwoven fabric containing one or more spunbond nonwoven fabrics of the present invention is excellent in uniform hot workability (advantageous effect).

The nonwoven fabric for use in the other layer than the layer of the spunbond nonwoven fabric of the first aspect and the second aspect of the present invention may be, though not specifically limited, a nonwoven fabric to be obtained according to a known production method such as a spun-bonding method, a melt-blowing method, a spun-lacing method, a carding method or the like.

[Method for Producing Spunbond Nonwoven Fabric]

The method for producing the spunbond nonwoven fabric for use in the first aspect of the present invention is, though not specifically limited, a production method for a spunbond nonwoven fabric that includes a step of melt-extruding the olefin-based resin composition (I) containing the olefin-based polymer (i) satisfying the following requirements (a) and (b).

(a) The melt flow rate (MFR) thereof, as measured under the condition of a temperature of 230° C. and a load of 21.18 N, is 1,000 g/10 min or more.

(b) The melting endothermic amount $\Delta H-D$, as measured from the melting endothermic curve drawn by keeping the composition at $-10°$ C. in a nitrogen atmosphere for 5 minutes and then heating it at 10° C./min in a nitrogen atmosphere using a differential scanning calorimeter (DSC), is less than 80 J/g.

The olefin-based polymer (i) satisfying the requirements (a) and (b) is the same as the olefin-based polymer (i) for use in the spunbond nonwoven fabric of the present invention described above, and preferred examples thereof are also the same. In addition, preferred ranges of the requirements (a) and (b) are also the same.

The production method for the spunbond nonwoven fabric for use in the second aspect of the present invention is a production method for a spunbond nonwoven fabric that includes a step of melt-extruding the olefin-based resin composition (I) containing the olefin-based polymer (1) satisfying the following requirements (a) and (b), at a resin temperature of 220° C. or lower.

(a) The melt flow rate (MFR) thereof, as measured under the condition of a temperature of 230° C. and a load of 21.18 N, is 1,000 g/10 min or more.

(b) The melting endothermic amount $\Delta H-D$, as measured from the melting endothermic curve drawn by keeping the composition at $-10°$ C. in a nitrogen atmosphere for 5 minutes and then heating it at 10° C./min in a nitrogen atmosphere using a differential scanning calorimeter (DSC), is less than 80 J/g.

The olefin-based polymer (i) satisfying the requirements (a) and (b) is the same as the olefin-based polymer (i) for use in the spunbond nonwoven fabric of the present invention described above, and preferred examples thereof are also the same. In addition, preferred ranges of the requirements (a) and (b) are also the same.

The production method for the spunbond nonwoven fabric for use in the second aspect of the present invention includes a step of melt-extruding the olefin-based resin composition (I) satisfying the above-mentioned requirements at a resin temperature of 220° C. or lower.

In the case where an olefin-based resin composition not satisfying the above-mentioned requirements is melt-extruded at a resin temperature of 220° C. or lower, the die pressure is unstable and the spinnability lowers. When the olefin resin composition not containing the olefin-based polymer (i) satisfying the requirements (a) and (b) is extruded at a resin temperature of 220° C. or lower, thread breakage occurs and it becomes difficult to obtain a spunbond nonwoven fabric having high formation uniformity.

On the other hand, in the case where the olefin-based resin composition (I) satisfying the above-mentioned requirement (i) is used and the melt extrusion is carried out at a resin temperature lower than 220° C., oriented crystallization of the fibers constituting the nonwoven fabric formed proceeds sufficiently and the stiffness of the fibers is not too low, and therefore a spunbond nonwoven fabric having higher formation uniformity can be obtained.

From these viewpoints, the resin temperature of the olefin-based resin composition in melt extrusion is preferably 215° C. or lower, more preferably 210° C. or lower. The lower limit of the resin temperature is, also though not specifically limited, generally not lower than the melting point of the olefin-based resin composition (I), and is preferably 180° C. or higher, more preferably 190° C. or higher.

The production method for the spunbond nonwoven fabric for use in the second aspect of the present invention is preferably a production method for a spunbond nonwoven fabric using the olefin-based resin composition (I) satisfying the following requirement (1).

(1) MFR of the resin composition, as measured under the condition of a temperature of 230° C. and a load of 21.18 N, is 40 g/10 min or more.

The olefin-based resin composition (I) containing the olefin-based polymer (i) that satisfies the above requirements (a) and (b), and further satisfying the above (1) is the same as the olefin-based resin composition (I) satisfying the requirement for use in the spunbond nonwoven fabric of the present invention mentioned above, and preferred examples thereof are also the same. The preferred range of the requirement (1) is also the same as above.

Since the olefin-based resin composition (I) satisfying the requirement is used, the die pressure is not unstable and the spinnability is improved more even when the melt extrusion is carried out at a resin temperature of 220° C. or lower. Since the olefin-based resin composition (I) satisfying the above requirement (1) contains the olefin-based polymer (i) satisfying the above requirements (a) and (b), the melt extrusion is stable even though the resin composition is extruded at a resin temperature of 220° C. or lower, and the spinnability is stabilized with preventing thread breakage. Further, since the resin composition is extruded at a resin temperature of 220° C. or lower, the crystallization on the spinning line is promoted, and the stiffness of the fibers formed is high, and therefore a spunbond nonwoven fabric having high formation uniformity can be obtained.

In a spunbonding method, in general, a melt-kneaded crystalline resin composition is spun, stretched and opened to give continuous long fibers, and in the subsequent continuous process, the continuous long fibers are deposited on a moving and collecting surface and entangled thereon to give a spunbond nonwoven fabric. According to the method, a nonwoven fabric can be produced continuously, and the fibers constituting the spunbond nonwoven fabric are stretched continuous long fibers and therefore have high strength.

As the spunbonding method, any conventional known method is employable. For example, from a large nozzle having thousands of holes or from a group of small nozzles each having 40 holes or so, fibers can be produced through extrusion of a molten polymer. Here, the fiber-ejecting amount per hole is preferably 0.1 to 1 g/min, more preferably 0.3 to 0.7 g/min. After discharged out of the nozzle, the molten fibers are cooled in a cross-flow cold air system, and thereafter separated from the nozzle and stretched by high-speed air. In general, there are known two kinds of air damping methods, and a venturi effect is used in both the two. The first method is a method of stretching filaments using a suction slot (slot stretching) in the nozzle width or the machine width. The second method is for stretching filaments via a nozzle or a suction gun. The filaments formed according to this method are collected on a screen (wire) or on a pore-forming belt to form a web thereon. Next, the web passes through compression rolls, and then passes between hot calender rolls (for example, a pair of calender rolls of an emboss roll and a flat roll (also referred to as S-roll)), in which the web bonds in the part where a rising part of one roll includes an area of 10 to 40% of the web, thereby forming a nonwoven fabric.

As the bonding mode, thermal bonding suc as embossing, bonding with hot air, and calendaring; adhesive bonding; mechanical bonding such as needle punching and water punching; etc., is employable.

[Multilayer Nonwoven Fabric of First Aspect or Second Aspect of Invention]

The spunbond nonwoven fabric of the first aspect or the second aspect of the present invention may be a multilayer nonwoven fabric produced by layering two or more layers. In the case, it is desirable that at least one layer of the nonwoven fabric constituting the outer layer of the multilayer nonwoven fabric is the spunbond nonwoven fabric of the first aspect or the second aspect of the present invention mentioned above.

The method for producing the multilayer nonwoven fabric is not specifically limited, and the multilayer nonwoven fabric can be produced in any known method. For example, first, a spunbond nonwoven fabric of the first aspect or the second aspect of the present invention is produced, and any other nonwoven fabric is formed thereon according to a spun-bonding method, a melt-blowing method or the like, and if desired, a spunbond nonwoven fabric of the first aspect or the second aspect of the present invention or any other nonwoven fabric is further layered thereon, and fused with heating under pressure. The other nonwoven fabric is not specifically limited, and a nonwoven fabric to be obtained according to a known production method of a spun-bonding method, a melt-blowing method, a spun-lacing method, a carding method or the like may be employed. A melt-blown nonwoven fabric obtained according to a melt-blowing method is preferred.

The layering means in producing the multilayer nonwoven fabric includes various layering methods of thermal bonding, adhesive bonding or the like, but a simple and inexpensive thermal bonding layering method, especially a thermal embossing roll method may also be employed. In the thermal embossing roll method, nonwoven fabrics may be layered using a known layering device including an embossing roll and a flat roll, like in the method of using hot calender rolls mentioned above. For the embossing roll, various types of embossing patterns may be employed, and the bonding parts may have continuous grid-like patterns, independent grid-like patterns or any random distribution patterns.

[Fiber Product]

Although the fiber product using the spunbond nonwoven fabric of the first aspect or the second aspect of the present invention, and the fiber product using the above-mentioned multilayer nonwoven fabric are not particularly limited, the following fiber products may be exemplified. That is, there may be exemplified a member for a disposable diaper, a stretchable member for a diaper cover, a stretchable member for a sanitary product, a stretchable member for a hygienic product, a stretchable tape, an adhesive bandage, a stretchable member for clothing, an insulating material for clothing, a heat insulating material for clothing, a protective suit, a hat, a mask, a glove, a supporter, a stretchable bandage, a base fabric for a fomentation, a non-slip base fabric, a vibration absorber, a finger cot, an air filter for a clean room, an electret filter subjected to electret processing, a separator, a heat insulator, a coffee bag, a food packaging material, a ceiling skin material for an automobile, an acoustic insulating material, a cushioning material, a speaker dust-proof material, an air cleaner material, an insulator skin, a backing material, an adhesive nonwoven fabric sheet, various members for automobiles, such as a door trim, etc., various cleaning materials, such as a cleaning material for a copying machine, the facing and backing of a carpet, an agricultural beaming, a timber drain, members for shoes, such as a sport shoe skin, etc., a member for a bag, an industrial sealing material, a wiping material, a sheet, etc.

<<Third Aspect of Invention>>

[Nonwoven Fabric Formed of Composite Fibers]

The nonwoven fabric formed of composite fibers of the third aspect of the present invention is a nonwoven fabric formed of composite fibers containing the following first component and second component;

The first component is an olefin-based resin composition (I) containing an olefin-based polymer (i) satisfying the following requirements (a) and (b):

(a) The melt flow rate (MFR) thereof, as measured under the condition of a temperature of 230° C. and a load of 21.18 N is 1,000 g/10 min or more;

(b) The melting endothermic amount ΔH–D, as measured from the melting endothermic curve drawn by keeping the composition at −10° C. in a nitrogen atmosphere for 5 minutes and then heating it at 10° C./min in a nitrogen atmosphere using a differential scanning calorimeter (DSC), is less than 80 J/g.

The second component is an olefin-based resin composition (II) containing an olefin-based polymer (ii) satisfying the following requirements (e) and (f):

(e) The melt flow rate (MFR) thereof, as measured under the condition of a temperature of 230° C. and a load of 21.18 N is 1 g/10 min or more and 100 g/10 min or less;

(f) The melting point (Tm–D), as defined as a peak top of a peak observed on the highest temperature side of the melting endothermic curve drawn by keeping the composition at −10° C. in a nitrogen atmosphere for 5 minutes and then heating it at 10° C./min in a nitrogen atmosphere using a differential scanning calorimeter (DSC), is higher than 120° C.

Here in this description, "composite fiber" is used to include "core-sheath type fiber" of a fiber in which the cross section of the fiber is composed of "core" of an inner layer part and "sheath" of an outer layer part, and "crimped fiber" of a fiber of a combination of thermoplastic resins that differ in thermal shrinkage. "Crimped fiber" is used to include "side-by-side type fiber" and "eccentric core-sheath type fiber". "Side-by-side type fiber" is a fiber obtained by melt-extruding at least two kinds of resins, bonding and spinning the at least two types of resins. The form of the cross section of the side-by-side type fiber is not limited to a substantially circular ne (including "true circle"), but in consideration of the bulkiness of the fiber, the form may be an oval one, a daruma-like (cocoon-like) one or the like, but from the viewpoint of popularity, the form is preferably a true circle.

"Substantially circular one" means that the ratio of the lengths of the two axes crossing at 90° in the center of the cross section of the fiber is about 1.2/1 or less, and "true circle" means that the ratio of the lengths of the two axes crossing at 90° in the center of the cross section of the fiber is about 1/1. "Oval" means that the ratio of the lengths of the two axes crossing at 90° in the center of the cross section of the fiber is larger than about 1.2/1; and "daruma-like form" means a cross-section form of such that plural axes passing through the center of the cross section of the fiber each have a short axis and a long axis, and when the length of the long axis relative to the length of the short axis is plotted, the resultant curve has at least two maximum values.

The ratio of at least two kinds of resins that occupy the cross section of the side-by-side type fiber is determined depending on the extrusion ratio of the resins in melt extrusion.

"Eccentric core-sheath type fiber" indicates a fiber of such that, in the cross-section form of the eccentric core-sheath type fiber, the position of the center of gravity of the inner layer part differs from the position of the center of gravity of the whole fiber, and is formed using a composite nozzle which is so arranged that the position of the center of gravity of the inner layer part could differ from the position of the center of gravity of the whole fiber, for example, using an eccentric core-sheath type composite nozzle.

The ratio of at least two kinds of resins that occupy the cross section of the eccentric core-sheath type fiber is determined depending on the extrusion ratio of the resins in melt extrusion.

In the case where the first component is used for the core part of the core-sheath type fiber, the second component may be used for the sheath part; and in the case where the second component is used for the core part of the core-sheath type fiber, the first component may be used for the sheath part.

<First Component>

The first component is the olefin-based resin composition (I) that contains the olefin-based polymer (i) satisfying the above-mentioned requirements (a) and (b).

The requirements (a) and (b) are the same as those described for the spunbond nonwoven fabric of the first aspect of the invention and for the spunbond nonwoven fabric of the second aspect of the invention, and the preferred embodiments thereof are also the same. In addition, the constituent components usable for the olefin-based polymer (i) and the olefin-based resin composition (I) are the same as those described for the spunbond nonwoven fabric of the first aspect of the invention and for the spunbond nonwoven fabric of the second aspect of the invention, and the preferred embodiments thereof are also the same, unless otherwise specifically indicated.

The content of the olefin-based polymer (i) in the olefin-based resin composition (I) is, relative to the total amount 100% by mass of the olefin-based resin composition (I), preferably 1 to 50% by mass, more preferably 3 to 45% by mass, even more preferably 5 to 40% by mass. When the content of the olefin-based polymer (i) in the olefin-based resin composition (I) is 50% by mass or less, the crystallization speed on the spinning line is not extremely low and the spinnability is therefore stabilized. On the other hand, when the content of the olefin-based polymer (i) in the olefin-based resin composition (I) is 1% by mass or more, the fibers to be formed may be thinned, and with the reduction in the elastic modulus of the fibers, the flexibility of the nonwoven fabric to be formed is therefore bettered.

<Second Component>

The second component is the olefin-based resin composition (II) that contains the olefin-based polymer (ii) satisfying the following requirements (e) and (f).

(e) The melt flow rate (MFR) thereof, as measured under the condition of a temperature of 230° C. and a load of 21.18 N is 1 g/10 min or more and 100 g/10 min or less.

(f) The melting point (Tm–D), as defined as a peak top of a peak observed on the highest temperature side of the melting endothermic curve drawn by keeping the composition at –10° C. in a nitrogen atmosphere for 5 minutes and then heating it at 10° C./min in a nitrogen atmosphere using a differential scanning calorimeter (DSC), is higher than 120° C.

Regarding the olefin-based polymer (ii) for use in the third aspect of the present invention, MFR thereof, as measured at a temperature of 230° C. and under a load of 21.18 N is 1 g/10 min or more and less than 100 g/10 min, preferably 10 g/10 min or more and 90 g/10 min or less, more preferably 15 g/10 min or more and 80 g/10 min or less, still more preferably 20 g/10 min or more and 70 g/10 min or less.

The melt flow rate (MFR) is a value measured according to the measurement method stipulated in JIS K7210, using an extrusion-type plastometer defined in JIS K6760.

The olefin-based polymer (ii) for use in the third aspect of the present invention is not particularly limited so long as its melting point (Tm–D) defined as a peak top of a peak observed on the highest temperature side of the melting endothermic curve obtained by holding under a nitrogen atmosphere at –10° C. for 5 minutes and then increasing the temperature at a rate of 10° C./min under a nitrogen atmosphere by using a differential scanning calorimeter (DSC) exceeds 120° C. High-crystalline polypropylenes such as PP3155 (trade name, manufactured by ExxonMobil Chemical), Y2005GP (trade name, manufactured by Prime Polymer Co., Ltd.), Prime Polypro™ S119 (trade name, manufactured by Prime Polymer Co., Ltd.), NOVATEC-SA03 (trade name, manufactured by Japan Polypropylene Corporation) and the like may be used.

The olefin-based polymer (ii) may be either a propylene homopolymer or a copolymer. In the case of a copolymer, the copolymerization ratio of the propylene unit is 50 mol % or more, preferably 60 mol % or more, more preferably 70 mol % or more, still more preferably 90 mol % or more, and still even more preferably 95 mol % or more. Examples of copolymerizable monomers include α-olefins having 2 or 4 to 20 carbon atoms, such as ethylene, 1-butene, 1-pentene, 1-hexene, 1-octene, 1-decene, etc., acrylic esters, such as methyl acrylate, etc., vinyl acetate, and the like. From the viewpoint of moldability, a propylene homopolymer is preferred. One alone or two or more kinds of such polymers may be used either singly or as combined.

As the olefin-based polymer (ii), one having a melting point (Tm–D), defined as a peak top of a peak observed on the highest temperature side of the melting endothermic curve obtained by holding under a nitrogen atmosphere at –10° C. for 5 minutes and then increasing the temperature at a rate of 10° C./min under a nitrogen atmosphere by using a differential scanning calorimeter (DSC), of higher than 120° C. and 170° C. or lower is preferred, and one having the melting point of 125 to 167° C. is more preferred.

In the case where the second component is the olefin-based resin composition (II) containing the above-mentioned olefin-based polymer (ii), the component may contain the above-mentioned olefin-based polymer (i). In the case where the component contains the olefin-based polymer (i), the content of the olefin-based polymer (i) is less than the content of the olefin-based polymer (i) in the olefin-based resin composition (I).

The olefin-based polymer (ii) is preferably a propylene-based polymer (iip). Hereinunder in this description, the mere expression of propylene-based polymer (iip) means the propylene resin satisfying the above-mentioned requirements (e) and (f).

The propylene-based resin not satisfying the requirements includes, though not specifically limited thereto, the above-mentioned propylene-based polymer (ip), etc.

The olefin-based resin composition (II) is preferably a propylene-based resin composition (IIP). In this description, the propylene-based resin composition (IIP) indicates an olefin resin composition of the above-mentioned olefin-based resin composition (II) where the proportion of the propylene-based polymer (iip) is 50% by mass or more.

The proportion of the propylene-based polymer (lip) in the olefin-based resin composition (II) is preferably 85% by mass or more, more preferably 90% by mass or more, even more preferably 95% by mass or more.

Hereinunder in this description, the expression of propylene-based resin composition (IIP) indicates the propylene-based resin composition that contains the olefin-based polymer (ii) satisfying the above-mentioned requirements (e) and (f) for use in the third aspect of the present invention.

The other polypropylene in the above-mentioned first component and the propylene-based polymer (iip) in the second component may be the same resin or may be suitably selected from different resins, in accordance with the crimping degree and the elongation ratio of the crimped fibers.

The olefin-based resin composition (II) may contain any other thermoplastic resin and various additives such as release agent and the like, within a range not detracting from the advantageous effects of the third aspect of the present invention.

The other thermoplastic resin includes olefin polymers except the olefin-based polymer (i) and the olefin-based polymer (ii), concretely polypropylene, propylene-ethylene copolymer, propylene-ethylene-diene copolymer, polyethylene, ethylene-α-olefin copolymer, ethylene-vinyl acetate copolymer, hydrogenated styrenic elastomer, etc. There are also mentioned polyester, polyamide, polylactic acid, etc. These polymers may be employed singly or in combination of two or more species.

As the release agent and various additives except release agent, there are mentioned the same as those described hereinabove for the release agent and various additives that may be contained in the olefin-based resin composition (I) for the first aspect and the second aspect of the present invention mentioned above.

(Relation Between First Component and Second Component)

In the third aspect of the present invention, it is preferred that the first component and the second component are provided with the following relation.

In the case of the crimped fiber among the composite fibers for use in the third aspect of the present invention, the melt flow rate (MFR) of the olefin-based resin composition (I) that constitutes the first component preferably differs from the melt flow rate (MFR) of the olefin-based resin composition (II) that constitutes the second component.

Here, the melt flow rate (MFR) of the olefin-based resin composition (I) constituting the first component and that of the olefin-based resin composition (II) constituting the second component are values measured at a temperature of 230° C. and a load of 21.18 N by using an extrusion-type plastometer prescribed in JIS K6760 by the measurement method in conformity with JIS K7210.

In the above-described relation of the melt flow rate (MFR), as a difference in the MFR between the both components is large, the high crimping crimping performance are revealed. However, taking into consideration other physical properties, such as fiber strength, etc., the olefin-based resin composition (I) that is the first component, and the olefin-based resin composition (II) that is the second component, are properly selected in view of the above-described relation.

MFR of the olefin-based resin composition (I) for use in the third aspect of the present invention is 2,000 g/10 min or less, preferably 10 to 1,500 g/10 min, more preferably 15 to 1,000 g/10 min, even more preferably 18 to 900 g/10 min.

In the case where the nonwoven fabric formed of composite fibers is a crimped spunbond nonwoven fabric, MFR of the olefin-based resin composition (I) is preferably 30 to 200 g/10 min, more preferably 50 to 150 g/10 min, even more preferably 60 to 100 g/10 min.

On the other hand, in the case of the crimped fibers among the composite fibers for use in the third aspect of the present invention, MFR of the olefin-based resin composition (II) preferably satisfies the relation to MFR between the first component and the second component, and in consideration of the preferred range of MFR of the olefin-based resin composition (I) of the first component, MFR of the olefin resin composition (II) is 2,000 g/10 min or less, preferably 10 to 1,500 g/10 min, more preferably 15 to 1,000 g/10 min, even more preferably 18 to 900 g/10 min.

In the case where the nonwoven fabric formed of composite fibers is a crimped spunbond nonwoven fabric, MFR of the olefin-based resin composition (II) is preferably 1 to 100 g/10 min, more preferably 10 to 70 g/10 min, even more preferably 20 to 50 g/10 min.

Accordingly, in the case of producing crimped fibers, fibers having strong crimping performance can be obtained without any post treatment such as stretching or heating after the resin of the first component and the resin of the second component are bonded, extruded and spun through conventional melt extrusion. Heretofore, in consideration of the materials for use in production of crimped fibers and the physical properties thereof, the post-treatment step after spinning is indispensable, and depending on the post-treatment condition for stretching, heating and the like, the crimping degree may often vary. Consequently, in the case where the composite fibers for use in the third aspect of the present invention are crimped fibers, the post-treatment step is not indispensable, and therefore fibers having a stable crimping degree can be obtained, and in addition, owing to reduction in the number of the processing steps, the production cost can be reduced and the production apparatus can be down-sized.

In the composite fibers for use in the third aspect of the present invention, the ratio by mass of the olefin-based resin composition (I) of the first component/the olefin-based resin composition (II) of the second component is 10/90 to 90/10, preferably 20/80 to 80/20, more preferably 30/70 to 70/30. When the ratio by mass falls within a range of 10/90 to 90/10, the case of core-sheath type fibers can express flexibility and the case of crimped fibers can express crimping performance and stretching performance.

Further, when the first component contains the propylene-based polymer (i) in an amount falling within a range of 1% by mass or more and 50% by mass or less, and when the ratio by mass of the propylene-based resin composition (IP) of the first component/the propylene-based resin composition (IIP) of the second component is 10/90 to 90/10, the case of core-sheath type fibers can express flexibility and the case of crimped fibers is excellent in the balance of crimping performance, stretching performance and flexibility.

In the composite fibers for use in the third aspect of the present invention, any conventional known additive may be incorporated in at least one of the first component and the second component. In addition, at least one of the first component and the second component may further contain an internal release agent.

As the internal release agent and the other additives than the internal release agent, the same as those of the release agent and other various additives that the olefin-based resin composition (I) described in the section of the first aspect and the second aspect of the present invention may contain are referred to.

The content of the internal release agent is, based on the composition of the first component or the second component containing the internal release agent, preferably 10 to 10,000 ppm by mass, more preferably 100 to 5,000 ppm by mass. When the content of the internal release agent is 10 ppm by mass or more, the function as the release agent is revealed, whereas when it is 10,000 ppm by mass or less, the balance between the function of the release agent and the economic potential thereof is good.

In the nonwoven fabric formed of composite fibers of side-by-side fibers, the viscosity difference between the two components constituting the fibers is large, and in the case where the crystallization speed of the first component and that of the second component are both high, the fibers rapidly crimped just below the stretching process (ejector or cabin) for the fibers in the production method for the fibers to be described below. At this time, there is a concern that a roping phenomenon in which fibers are entangled with each other is revealed, whereby uniformity (uniformity of the appearance) of the nonwoven fabric is impaired.

Then, in one embodiment of the third aspect of the present invention, the present inventors have found that, by adding the propylene-based polymer (i) to the first component of the side-by-side fibers, it becomes possible to suppress the generation of the roping phenomenon following abrupt crimping just beneath the stretching step of fibers, and a nonwoven fabric of crimped fibers excellent in a balance between crimping performance and formation uniformity can be obtained.

[Production Method for Composite Fibers, and Nonwoven Fabric Formed of Composite Fibers]

Embodiments of the production method for composite fibers for use in the third aspect of the present invention and the production method for the nonwoven fabric formed of composite fibers are described below.

In one example of the production method for the composite fibers for use in the third aspect of the present invention, the resin components constituting the composite fibers may be melted in different extruders or the like. The resin extrusion amount of each resin component is suitably controlled, and the melts are ejected out through a spinning spinneret having a composite spinning nozzle as so designed that each melt can be ejected to form a desired structure (for example, core-sheath type (non-eccentric type), eccentric core-sheath type, side-by-side type, etc.), and spun into composite fibers. The spun composite fibers are optionally cooled with a cooling fluid, and further the core-sheath type fibers are given tension by stretching air or by a winding machine to have a predetermined fiber fineness. The temperature of the stretching air may be lower than the resin melt temperature, or the fibers may be stretched with high-temperature air.

In the case where a nonwoven fabric of the core-sheath type fibers is produced, the core-sheath type fibers may be directly collected on a collecting belt and deposited thereon to have a predetermined thickness, and are thereafter processed for entanglement to produce the intended nonwoven fabric.

<Production Method for Core-Sheath Type Fibers, and Nonwoven Fabric Formed of Core-Sheath Type Fibers>

Embodiments of the production method for the core-sheath type fibers that can be used as the composite fibers for use in the third aspect of the present invention and the production method for the nonwoven fabric formed of the core-sheath type fibers are described below.

In an example of the production method for the core-sheath type fibers for use in the third aspect of the present invention, first, the component to constitute the core and the component to constitute the sheath are separately melted in different extruders or the like. While the resin ejecting amount of each component is suitably controlled, the melts are ejected through a spinning spinneret having a composite spinning nozzle as so designed that each melt can be ejected to form a desired core-sheath structure, and spun into core-sheath type composite fibers. The spun core-sheath type composite fibers are optionally cooled with a cooling fluid, and further the fibers are given tension by stretching air or by a winding machine to have a predetermined fiber fineness. The temperature of the stretching air may be lower than the resin melt temperature, or the fibers may be stretched with high-temperature air.

In the case where a nonwoven fabric of the core-sheath type fibers is produced, the core-sheath type fibers may be directly collected on a collecting belt and deposited thereon to have a predetermined thickness, and are thereafter processed for entanglement to produce the intended nonwoven fabric.

<Production Method for Side-By-Side Type Fibers, and Nonwoven Fabric Formed of Side-By-Side Type Fibers>

Embodiments of the production method for the side-by-side type fibers that can be used as the composite fibers for use in the third aspect of the present invention and the production method for the nonwoven fabric formed of the side-by-side type fibers are described below.

In an example of the production method for the side-by-side type fibers for use in the third aspect of the present invention, first, at least two resin components are separately melted in different extruders or the like, and while the resin ejecting amount of each component is suitably controlled, the resin melts are extruded out. For example, the resin melts are extruded from special spinning nozzles as disclosed in, for example, U.S. Pat. No. 3,671,379. The resin melts thus melt-extruded through different extruders are joined and discharged to be fibers, followed by cooling for solidification. Examples of the production method employable for the process of cooling fibers and stretching them are the same as those of the production method for the core-sheath type fibers described hereinabove.

Here, the discharge speed, the stretching air during spinning and the take-off wind-up speed are property set depending upon the physical properties of the resins, the mass ratio of the resin components (in the case where the resin components are two components, the physical properties of the two components and the mass ratio thereof, etc.).

In the case where a nonwoven fabric formed of the side-by-side type fibers is produced, the side-by-side type fibers may be directly collected on a collecting belt and deposited thereon to have a predetermined thickness, and are thereafter processed for entanglement to produce the intended nonwoven fabric.

In the production method for the side-by-side type fibers for use in the third aspect of the present invention, the desired fibers may be produced even without performing a post-treatment step, such as heating or stretching after spinning, etc.; however, the above-described post-treatment step may be adopted, if desired. For example, the crimping degree of the fibers may be increased by heating at 100 to 150° C., stretching in a ratio of 1.2 to 5 times, or a combined condition thereof.

In one embodiment of the present invention, in the side-by-side type fibers for use in the third aspect of the invention, the above-described propylene-based polymer (i) is compounded in only the first component, but the present invention is not limited thereto. The above-described propylene-based polymer (i) may also be added to the second component according to the melting point and the physical properties of the propylene-based polymer (i) to be added, as so described hereinabove.

As for the side-by-side type fibers constituting the crimped nonwoven fabric of the third aspect of the present invention, the fineness thereof as calculated by the following measuring method is preferably 0.5 deniers or more and 2.5 deniers or less, and more preferably 0.8 to 2.0 deniers from the viewpoints of the balance between the texture, the flexibility and the strength of the nonwoven fabric. The crimped nonwoven fabric of third aspect of the present invention is small in terms of the fineness as described above and is excellent in terms of spinning stability even under forming conditions under which thread breakage likely occurs.

The value of fineness is a value obtained according to the method described in the section of Examples given hereinunder.

<Production Method for Eccentric Core-Sheath Type Fibers, and Nonwoven Fabric Formed of Eccentric Core-Sheath Type Fibers>

Embodiments of the production method for the eccentric core-sheath type fibers that can be used as crimped fibers in the third aspect of the present invention, and the production method for the nonwoven fabric formed of the eccentric core-sheath type fibers are the same as those of the production method for the core-sheath type fibers and for the nonwoven fabric formed of the core-sheath type fibers described hereinabove, except that an eccentric core-sheath type nozzle is used in place of the core-sheath composite nozzle, and therefore the detailed description thereof is omitted here.

The nonwoven fabric formed of the composite fibers of the third aspect of the present invention can be prepared by cutting the composite fibers capable of being used in the third aspect of the present invention to give short fibers, followed by processing the resultant short fibers according to a carding method or a spunlacing method, or further through chemical bonding or thermal bonding. Further, in the case where the composite fibers are crimped fibers, the nonwoven fabric of continuous fibers produced by air-stretching or the nonwoven fabric of short fibers is first produced, and then the crimping degree of the fibers in the nonwoven fabric may be increased by further stretching or heating.

In the case of producing a nonwoven fabric, fiber bundles layered on a net surface are subjected to thermal press bonding to form the nonwoven fabric. When the heating temperature is excessively high, sufficient bulkiness is not obtained, whereas when the heating temperature is low, fusion of the fibers is not sufficient, so that it may be expected that fluffing is generated. As for the nonwoven fabric formed of the composite fibers of the third aspect of the present invention, it is possible to form a nonwoven fabric at a heating temperature that is a relatively low temperature as 20° C. to 100° C., sufficient bulkiness is obtained, and a fluffing-free nonwoven fabric may be obtained.

In the case where an embossing area ratio is small, even if the embossing temperature is not a relatively low temperature, it is possible to obtain a nonwoven fabric that is bulky and free from fluffing.

Here, the "embossing area ratio" refers to an occupation ratio of an embossed pattern area per unit area.

[Multilayer Nonwoven Fabric of Third Aspect of Invention]

The nonwoven fabric formed of composite fibers of the third aspect of the present invention is a spunbond nonwoven fabric using the above-mentioned core-sheath type fibers and/or crimped fibers (any of side-by-side type fibers or eccentric core-sheath type fibers), and may be a multilayer nonwoven fabric produced by layering with various layers depending on the use thereof or by layering two or more layers. In this case, from the viewpoint of surface smoothness, it is desirable that at least one nonwoven fabric layer to constitute the outer layer of the multilayer nonwoven fabric is the above-mentioned spunbond nonwoven fabric.

Specifically, examples of various layers include a knitted fabric, a woven fabric, a nonwoven fabric, a film, etc. As a method of layering the fibrous nonwoven fabric with any other layer (by bonding), various known method are employable, including a thermal fusion bonding method of thermal embossing, ultrasonic fusion bonding or the like, a mechanical entangling method of needle punching, water-jet treatment or the like, a method of using an adhesive such as a hot-melt adhesive, an urethane adhesive or the like, and an extrusion lamination method, etc. A simple and inexpensive thermal adhesion layering method, especially a thermal embossing roll method is also employable. In the thermal embossing roll method, the fabrics may be layered using a known layering device equipped with an embossing roll and a flat roll, like in the above-mentioned thermal calendering roll method. For the embossing roll, various types of embossing patterns are employable, and the bonding parts may have continuous grid-like patterns, independent grid-like patterns or any random distribution patterns.

For example, there may be mentioned a method where a nonwoven fabric formed of composite fibers of the third aspect of the present invention is first produced, and any other nonwoven fabric is formed thereon according to a spunbonding method, a melt-blowing method or the like, and optionally a nonwoven fabric formed of composite fibers of the third aspect of the present invention or any other nonwoven fabric is further laminated thereon, and then bonded by heating under pressure. As the other nonwoven fabric, any other nonwoven fabric than the nonwoven fabric of the third aspect of the present invention including, though not specifically limited thereto, a spunbond nonwoven fabric, a melt-blown nonwoven fabric, a wet-process nonwoven fabric, a dry-process nonwoven fabric, a dry-process pulp nonwoven fabric, a flash-spinning nonwoven fabric, an open fiber nonwoven fabric and the like, may be used. From the viewpoint of formation uniformity, a melt-blown nonwoven fabric to be produced according to a melt-blowing method is preferred.

The material to constitute the other nonwoven fabric than the nonwoven fabric of the third aspect of the present invention includes various known thermoplastic resins, and examples thereof include polyolefins such as high-pressure process low-density polyethylene, linear low-density polyethylene (so-called LLDPE) high-density polyethylene, polypropylene, polypropylene random copolymer, poly-1-butene, poly-4-methyl-1-pentene, ethylene-propylene random copolymer, ethylene-1-butene random copolymer, propylene-1-butene random copolymer and others that are homo or copolymers of α-olefins such as ethylene, propylene, 1-butene, 1-hexene, 4-methyl-1-pentene, 1-octene or the like; polyesters (polyethylene terephthalate, polybutylene terephthalate, polyethylene naphthalate, etc.), polyamides (nylon-6, nylon-66, polymetaxyleneadipamide, etc.), polyvinyl chlorides, polyimides, ethylene-vinyl acetate copolymers, polyacrylonitriles, polycarbonates, polystyrenes, ionomers, thermoplastic polyurethanes, their mixtures, etc. Among these, high-pressure process low-density polyethylene, linear low-density polyethylene (so-called LLDPE), high-density polyethylene, polypropylene, polypropylene random copolymer, polyethylene terephthalate, polyamide and the like are preferred.

As the film to be layered with the nonwoven fabric formed of composite fibers of the third aspect of the present invention, an air permeable (moisture permeable) film capable of taking advantage of the air permeability that is a characteristic feature of the nonwoven fabric formed of composite fibers of the third aspect of the present invention, is preferred. As the air permeable film, various known air permeable films are usable, and examples thereof include a film of a moisture permeable thermoplastic elastomer such as polyurethane-based elastomer, polyester-based elastomer, polyamide-based elastomer, etc., and a porous film produced by stretching a film of a thermoplastic resin containing inorganic or organic particles to make the film porous. The thermoplastic resin for the porous film is preferably a polyolefin such as high-pressure process low-density polyethylene, linear low-density polyethylene (so-called LLDPE), high-density polyethylene, polypropylene, polypropylene random copolymer or a composition thereof, etc.

The laminate with the air-pervious film can be a cloth-like composite material that takes advantage of bulkiness and flexibility of the nonwoven fabric of composite fibers of the third aspect of the present invention and has extremely high waterproofness.

[Fiber Product]

As examples of the fiber products using the nonwoven fabric of composite fibers of the third aspect of the present invention and the fiber products using the multilayer nonwoven fabric of the third aspect of the present invention, the same as those of the fiber products for the first aspect and the second aspect of the present invention that have been described hereinabove are referred to, though not specifically limited thereto. In the case where crimped fibers are used as the composite fibers, the fiber products can be used as heat-insulating materials from the viewpoint that the crimped nonwoven fabric is formed of bulky fibers having a high crimpling degree and a high stretching degree and secures air-retentive performance and heat-insulating performance.

EXAMPLES

The present invention is described in more detail with reference to Examples and Comparative Examples given below; however, the present invention is not whatsoever restricted by the description of these Examples.

Production Examples 1 to 3

Into a stirrer-equipped stainless steel-made reactor having an internal volume of 0.25 m$^3$, 26 L/h of n-heptane, 7.7 mmol/h of triisobutylaluminum, and further a catalyst component obtained by previously bringing dimethylanilinium tetrakis(pentafluorophenyl)borate, (1,2'-dimethylsilylene) (2,1'-dimethylsilylene)-bis(3-trimethylsilylmethylindenyl) zirconium dichloride, triisobutylaluminum, and propylene into contact with each other were continuously supplied. Propylene and hydrogen were continuously supplied so as to keep a whole pressure within the reactor to 1.0 MPa·G, and a polymerization temperature was properly adjusted to obtain a polymerization solution having a desired molecular weight. To the resulting polymerization solution, an antioxidant was added in an amount of 1,000 ppm by mass, and the solvent was removed to give a propylene-based polymer (1), (2) and (3).

The physical properties of the propylene polymer are shown in Table 1 below.

The physical properties of the propylene-based polymer and the physical properties of the propylene-based resin composition used in Examples and Comparative Examples were determined according to the measurements mentioned below.

<Melt Flow Rate (MFR)>

Measured at a temperature of 230° C. and under a load of 21.18 N according to JIS K7210:1999.

<Melting Endothermic Amount (ΔH–D)>

Using a differential scanning calorimeter (manufactured by Perkin Elmer Inc., trade name "DSC-7"), 10 mg of the sample was kept at –10° C. in a nitrogen atmosphere for 5 minutes and then heated at 10° C./min in a nitrogen atmosphere, and from the resultant melting endothermic curve, the melting endothermic amount ΔH–D was determined.

<Measurement of $^{13}$C-NMR Spectrum]

The $^{13}$C-NMR spectrum was measured with the following device under the following conditions in accordance with the assignment of the peak, as proposed by A. Zambelli, et al., "Macromolecules, 8, 687 (1975)".

Device: $^{13}$C-NMR device, "JNM-EX400 Model", manufactured by JEOL, Ltd.
Method: Proton complete decoupling method
Concentration: 220 mg/mL
Solvent: Mixed solvent of 1,2,4-trichlorobenzene and deuterated benzene in a ratio of 90/10 (volume ratio)
Temperature: 130° C.
Pulse width: 45°
Pulse repetition time: 4 seconds
Accumulation: 10,000 times <Calculating Expressions>
M=m/S×100
R=γ/S×100
S=Pββ+Paβ+Paγ
S: Signal intensity of carbon atoms in side chain methyl of all the propylene units
Pββ: 19.8 to 22.5 ppm
Paβ: 18.0 to 17.5 ppm
Paγ: 17.5 to 17.1 ppm
γ: Racemic pentad chain, 20.7 to 20.3 ppm
m: Mesopentad chain, 21.7 to 22.5 ppm

TABLE 1

|  | Production Example 1 | Production Example 2 | Production Example 3 |
|---|---|---|---|
| Propylene-based polymer | (1) | (2) | (3) |
| MFR (g/10 min) | 2000 | 350 | 50 |
| Melting endothermic amount ΔH-D (J/g) | 38 | 35 | 37 |
| [mmmm] (mol %) | 47.7 | 49.0 | 49.7 |
| [rrrr]/(1 – [mmmm]) | 0.05 | 0.05 | 0.05 |

[Production of Spunbond Nonwoven Fabric]

Next, Examples and Comparative Examples of nonwoven fabrics using the above-mentioned materials and other polypropylenes are described.

Example 1

10% by mass of the propylene-based polymer (1) obtained in Production Example 1, 86% by mass of "NOVATEC-SA03" (trade name, manufactured by Nippon Polypropylene Corporation, MFR: 30 g/10 min, melting point: 160° C.), and 4% by mass of an erucamide master batch prepared by mixing 95% by mass of "Y6005GM" (trade name, manufactured by Primer Polymer Co., Ltd., MFR: 60 g/10 min) and 5% by mass of erucamide (2,000 ppm by mass, based on the propylene-based resin composition, of erucamide was added) were mixed to prepare a propylene-based resin composition.

The propylene-based resin composition was melt-extruded at a resin temperature of 200° C. using a single-screw extruder having a gear pump, and the molten resin was discharged through a nozzle having a diameter of 0.5 mm (number of holes, 2,675) at a single hole discharge rate of 0.4 g/min/hole to thereby carry out spinning. While the fibers produced through spinning were cooled with cold air at 12.5° C. and at a rate of 0.3 m/sec, the fibers were aspirated under a pressure of 1.0 kg/cm$^2$ by means of an ejector below the nozzle, to thereby stack the fibers onto a net surface moving at a line speed of 119 m/min.

The fiber bundles stacked on the net surface were subjected to embossing by means of a calender roll heated at 135° C. under a nip pressure of 40 N/mm, and then wound around a take-up roll.

The basis weight of the resultant spunbond nonwoven fabric was measured and the uniformity of formation thereof was evaluated according to the methods mentioned below. The measurement results are shown in Table 2.

Comparative Example 1

A spunbond nonwoven fabric was produced in the same manner as in Example 1 except that the propylene-based resin composition was prepared by mixing 10% by weight of the propylene-based polymer (2) produced in Production Example 2, 86% by mass of "NOVATEC-SA03" manufactured by Nippon Polypropylene Corporation, and 4% by mass of the erucamide master batch prepared in the same manner as in Example 1 (2,000 ppm by mass, based on the propylene-based resin composition, of erucamide was added), and the resultant nonwoven fabric was analyzed. The measurement results are shown in Table 2.

Comparative Example 2

A spunbond nonwoven fabric was produced in the same manner as in Example 1 except that the propylene-based resin composition was prepared by mixing 10% by weight of the propylene-based polymer (3) produced in Production Example 3, 86% by mass of "NOVATEC-SA03" manufactured by Nippon Polypropylene Corporation, and 4% by mass of the erucamide master batch prepared in the same manner as in Example 1 (2,000 ppm by mass, based on the propylene-based resin composition, of erucamide was added), and the resultant nonwoven fabric was analyzed. The measurement results are shown in Table 2.

Comparative Example 3

A spunbond nonwoven fabric was produced in the same manner as in Example 1 except that the propylene-based resin composition was prepared by mixing 96% by mass of "NOVATEC-SA03" manufactured by Nippon Polypropylene Corporation and 4% by mass of the erucamide master batch prepared in the same manner as in Example 1 (2,000 ppm by mass, based on the propylene-based resin composition, of erucamide was added), and the resultant nonwoven fabric was analyzed. The measurement results are shown in Table 2.

Reference Example 1

A nonwoven fabric was produced in the same manner as in Example 1 except that resin composition was melted at 240° C. and extruded, and the resultant nonwoven fabric was analyzed. The measurement results are shown in Table 2.

Comparative Example 4

A nonwoven fabric was produced in the same manner as in Reference Example 1 except that the propylene-based resin composition was prepared by mixing 5% by mass of the propylene-based polymer (3) produced in Production Example 3, 5% by mass of propylene-ethylene copolymer (1) "Vistamaxx 6202" (trade name, manufactured by Exxon Mobile Chemical, MFR: 19 g/10 min, ΔH–D: 19 J/g), 86% by mass of "NOVATEC-SA03" manufactured by Nippon Polypropylene Corporation, and 4% by mass of the erucamide master batch prepared in the same manner as in Example 1 (2,000 ppm by mass, based on the propylene-based resin composition, of erucamide was added), the cooling air in spinning was at 20.0° C. and at 1.0 m/sec, and the suction pressure of the ejector was 3.0 kg/cm², and the resultant nonwoven fabric was analyzed. The measurement results are shown in Table 2.

Comparative Example 5

A nonwoven fabric was produced in the same manner as in Comparative Example 4 except that the propylene-based resin composition was prepared by mixing 2% by mass of the propylene-based polymer (3) produced in Production Example 3, 8% by mass of propylene-ethylene copolymer (1) "Vistamaxx 6202" (trade name, manufactured by Exxon Mobile Chemical, MFR: 19 g/10 min, ΔH–D: 19 J/g), 86% by mass of "NOVATEC-SA03" manufactured by Nippon Polypropylene Corporation, and 4% by mass of the erucamide master batch prepared in the same manner as in Example 1 (2,000 ppm by mass, based on the propylene-based resin composition, of erucamide was added), and the suction pressure of the ejector in spinning was 3.5 kg/cm², and the resultant nonwoven fabric was analyzed. The measurement results are shown in Table 2.

TABLE 2

| | | | Unit | Example 1 | Comparative Example 1 | Comparative Example 2 | Comparative Example 3 | Comparative Example 4 | Comparative Example 5 | Reference Example 1 |
|---|---|---|---|---|---|---|---|---|---|---|
| Propylene-based resin composition | Components | Propylene-based polymer (1) | mass % | 10 | 0 | 0 | 0 | 0 | 0 | 10 |
| | | Propylene-based polymer (2) | mass % | 0 | 10 | 0 | 0 | 0 | 0 | 0 |
| | | Propylene-based polymer (3) | mass % | 0 | 0 | 10 | 0 | 5 | 2 | 0 |
| | | Propylene-ethylene copolymer (1) *1 | mass % | 0 | 0 | 0 | 0 | 5 | 8 | 0 |
| | | Other propylene-based polymer *2 | mass % | 86 | 86 | 86 | 96 | 86 | 86 | 86 |
| | | Erucamide master batch *3 | mass % | 4 | 4 | 4 | 4 | 4 | 4 | 4 |
| | Resin physical properties | Total MFR | g/10 min | 47 | 39 | 33 | 31 | 30 | 29 | 47 |
| | | Melting endothermic amount ΔH-D | J/g | 86 | 86 | 86 | 92 | 85 | 86 | 86 |
| Extrusion molding condition | | Molten resin temperature | ° C. | 200 | 200 | 200 | 200 | 240 | 240 | 240 |
| | | Extrusion amount/hole | g/min/hole | 0.4 | 0.4 | 0.4 | 0.4 | 0.4 | 0.4 | 0.4 |
| Spinning condition | | Cooling air temperature | ° C. | 12.5 | 12.5 | 12.5 | 12.5 | 20.0 | 20.0 | 12.5 |
| | | Cooling air speed | m/sec | 0.3 | 0.3 | 0.3 | 0.3 | 1.0 | 1.0 | 0.3 |
| | | Ejector pressure | kg/cm² | 1.0 | 1.0 | 1.0 | 1.0 | 3.0 | 3.5 | 1.0 |
| Line condition | | Calender temperature *4 | ° C./° C. | 135/135 | 135/135 | 135/135 | 135/135 | 135/135 | 135/135 | 135/135 |
| | | Nip pressure | N/mm | 40 | 40 | 40 | 40 | 40 | 40 | 40 |
| | | Line speed | m/min | 119 | 119 | 119 | 119 | 119 | 119 | 119 |
| | | Thread breakage | time/min | 0 | 0 | 0 | Occurred frequently | 0 | 0 | 0 |
| Physical properties of nonwoven fabric | | Basis weight | gsm | 15.3 | 15.5 | 15.8 | n.d. *5 | 15 | 15 | 15.9 |
| | | Uniformity | | 2.9 | 3.9 | 4.7 | n.d. *5 | 4.0 | 6.2 | 3.9 |

*1: Vistamaxx 6202: MFR 19 g/10 min
*2: Propylene-based polymer (4): NOVATEC SA03; MFR 30 g/10 min
*3: Composition of erucamide master batch: Y6005GM, 95 mass %; erucamide, 5 mass %
*4: Left-side value/right-side value = emboss roll temperature/S-roll temperature
*5: n.d. = Sampling was impossible owing to unstable spinning (frequent thread breakage), and measurement was impossible.

From the results in Table 2, it is known that the spunbond nonwoven fabric of Example 1 that had been produced using the propylene-based resin composition containing the propylene-based polymer as an olefin-based polymer having a melting endothermic amount ΔH–D of 38 J/g and MFR of 2,000 g/10 min, in which the resin composition was melted and extruded at 200° C., was excellent in uniformity.

It is known that the uniformity of the spunbond nonwoven fabrics of Comparative Examples 1 and 2 using the propylene-based resin composition containing the propylene-based polymer having a melting endothermic amount ΔH–D of 35 J/g or 37 J/g and MFR of less than 1,000 g/10 min was low.

In Comparative Example 3 where the propylene-based resin polymer having MFR of less than 1,000 g/10 min alone was used, the spinning performance was unstable and thread breakage occurred frequently, and therefore a spunbond nonwoven fabric could not be obtained.

When the spunbond nonwoven fabric of Example 1 where the propylene-based resin composition containing the propylene-based polymer having MFR of 2,000 g/10 min as an olefin-based polymer was used and the resin composition was melt-extruded and molded at 200° C. was compared with the spunbond nonwoven fabric of Reference Example 1 where the resin composition temperature was changed to 240° C., it is known that the formation uniformity of the nonwoven fabric can be bettered by lowering the molten resin temperature.

Further, it is known that the formation uniformity of the spunbond nonwoven fabrics of Comparative Examples 4 and 5, in which the propylene-based resin composition containing the propylene-ethylene copolymer having a melting endothermic amount ΔH–D of 19 J/g and MFR of less than 1,000 g/10 min was used and the resin composition was melted, extruded and molded at 240° C., is also low.

[Evaluation Method for Spunbond Nonwoven Fabric]

<Basis Weight>

The weight of the resultant nonwoven fabric (5 cm×5 cm) was measured, and the basis weight (g/m² [also expressed as gsm]) thereof was determined.

<Formation Uniformity of Nonwoven Fabric>

16 sheets of specimens of 74 mm×53 mm were prepared from the resultant nonwoven fabric. Subsequently, an image having been converted into digital data was obtained using a scanner in a state where a black drawing paper was superimposed on every specimen. Each of the resultant image data was processed to a gray scale (the degree of white and black was divided into 255 grades; it means that as the value is large, the color is white), and from the histogram, the mean value of gray scales and the standard deviation of the gray scale values of the 16 sheets of specimens were obtained.

An index that indicates the formation uniformity of the nonwoven fabric was calculated from the mean value and the standard deviation of the gray scale values according to the formula [1]. As the value is small, the formation uniformity of the nonwoven fabric is excellent.

[Formation uniformity of nonwoven fabric]=[mean value of gray scales]/[standard deviation of gray scales]   [1]

[Production of Crimped Nonwoven Fabric]

Next, Examples and Comparative Examples of crimped nonwoven fabrics and multilayer nonwoven fabrics using the above-mentioned materials and other materials are described. The components in Table 3 and Table 4, which were used in preparing the first component and the second component in Examples 3-1 to 3-5 and Comparative Example 3-1 shown below, are as follows.

Propylene-based polymer (4): "NOVATEC-SA03" (trade name, manufactured by Japan Polypropylene Corporation, MFR: 30 g/10 min, melting point (Tm–D): 160° C.)

Propylene-based polymer (5): "PP3155" (trade name, manufactured by Exxon Mobil Chemical, MFR: 35 g/10 min)

Propylene-based polymer (6): "Prime Polypro™ S119" (trade name, manufactured by Prime Polymer Co., Ltd., MFR: 60 g/10 min, melting point (Tm–D): 166° C.)

Propylene-based polymer (7): "Moplen HP461Y" (trade name, manufactured by PolyMirae, MFR: 1,300 g/10 min, melting point (Tm–D): 165° C.)

Propylene-based polymer (8): "HG475" (trade name, manufactured by Borealis AG, MFR: 27 g/10 min)

Propylene-based polymer (9): "HG455FB" (trade name, manufactured by Borealis AG, MFR: 27 g/10 min, melting point (Tm–D): 161° C. (according to ISO 11357-3))

MFR of the above-mentioned propylene-based polymers (4) to (9), and MFR of the olefin-based resin composition (I) of the first component and the olefin-based resin composition (II) of the second component in the following Table 3 and Table 4 were measured according to the above-mentioned measurement method.

The melting endothermic amount ΔH–D of the olefin-based resin composition (I) of the first component in Table 3 and Table 4 was measured according to the above-mentioned measurement method.

The melting point (Tm–D) was, unless otherwise specifically indicated, measured according to the method mentioned below.

<Melting Point (Tm–D)>

Using a differential scanning calorimeter (manufactured by Perkin Elmer Inc., trade name "DSC-7"), 10 mg of the sample was kept at –10° C. in a nitrogen atmosphere for 5 minutes and then heated at 10° C./min, and from the peak top at the peak observed on the highest temperature side of the resultant melting endothermic curve, the melting point Tm–D was determined.

Example 3-1

(Preparation of First Component)

20% by mass of the propylene-based polymer (1) obtained in Production Example 1, 78% by mass of the propylene-based polymer (4), and 2% by mass of an erucamide master batch prepared by mixing 90% by mass of "Prime Polypro™ S119" (trade name, manufactured by Primer Polymer Co., Ltd., MFR: 60 g/10 min) and 10% by mass of erucamide (2,000 ppm by mass, based on the olefin-based resin composition (I), of erucamide was added) were mixed to prepare an olefin-based resin composition (I).

(Preparation of Second Component)

98% by mass of the propylene-based polymer (4), as the propylene-based polymer (ii), and 2% by mass of an erucamide master batch prepared by mixing 90% by mass of "Prime Polypro™ S119" (trade name, manufactured by Primer Polymer Co., Ltd., MFR: 60 g/10 min) and 10% by mass of erucamide (2,000 ppm by mass, based on the olefin-based resin composition (II), of erucamide was added) were mixed to prepare an olefin-based resin composition (II).

(Production of Side-By-Side Type Crimped Nonwoven Fabric)

The first component and the second component were independently melt-extruded at a resin temperature of 240°

C., using separate single-screw extruders, and the molten resins were ejected through a side-by-side type composite nozzle (number of holes, 1,795 holes) having a nozzle diameter of 0.6 mm, at a speed of 0.35 g/min/hole in such a manner that the ratio of the first component to the second component could be 70/30, and thus spun.

The fibers obtained through the spinning were, while cooled with air at a temperature of 12.5° C. and at a wind speed of 0.6 m/sec, suctioned with an ejector arranged at 1,400 mm below the nozzle, under an ejector pressure of 2.0 kg/cm², and were thus deposited on the net surface moving at a line speed of 53 m/min at 255 mm below the nozzle.

The fiber bundles deposited on the net surface were embossed with an embossing roll heated at 50° C. under a linear pressure of 40 N/mm, and the crimped nonwoven fabric having a basis weight of 20 g/m² wound up with a take-up roll.

The resultant crimped nonwoven fabric was analyzed and evaluated in the manner mentioned below. The results are shown in Table 3.

<Basis Weight>

The basis weight was measured according to the above-mentioned measurement method.

<Fineness>

[Fineness Measurement]

The fibers in the nonwoven fabric were observed under a polarizing microscope, and the average [d(m)] of the diameters of five randomly selected fibers was determined, and using the resin density [ρ=900,000 g/m³)], the fineness of the nonwoven fabric sample was calculated according to the following formula [2]:

$$\text{fineness(denier)} = \rho(g/m^3) \times \pi \times (d(m)/2)^2 \times 9{,}000 \ (m) \quad [2]$$

(Evaluation of Number of Crimps)

The number of crimps was measured using an automated crimp elastic modulus measuring device according to the measurement method of a number of crimps as prescribed in JIS L1015:2000. One fiber was extracted from a cotton-like sample before embossing in such a manner that a tension was not applied to the fiber, the length thereof when an initial load of 0.18 mN/tex was applied to 25 mm of the sample was measured, and the number of crimps at that time was counted, thereby determining the number of crimps in the length of 25 mm. It is meant that as the number of crimps is large, the fiber·nonwoven fabric product is high in crimping performance.

<Evaluation of Bulkiness>

Ten sheets of nonwoven fabric samples having a size of 5 cm×5 cm were superimposed, 1.9 g of a metal plate was placed on the superimposed nonwoven fabric samples, and the thickness of the superimposed nonwoven fabric samples was measured. It is meant that as the numerical value of the thickness is high, the nonwoven fabric is high in bulkiness.

<Uniformity of Formation of Nonwoven Fabric>

The formation uniformity was calculated and evaluated according to the above-mentioned evaluation method.

Example 3-2

(Preparation of First Component)

An olefin-based resin composition (I) was prepared in the same manner as that for the first component in Example 3-1 except that the above-mentioned propylene-based polymer (5) was mixed in place of the propylene-based polymer (4) in preparing the first component in Example 3-1.

(Preparation of Second Component)

An olefin-based resin composition (II) was prepared in the same manner as that for the second component in Example 3-1 except that the above-mentioned propylene-based polymer (8) was mixed in place of the propylene-based polymer (4) in preparing the second component in Example 3-1.

(Production of Side-By-Side Type Crimped Nonwoven Fabric)

The formation of a nonwoven fabric was performed using a spunbond machine (REICOFIL 4, manufactured by Reicofil GmbH). The first component and the second component were spun in such a manner that the components were independently melt extruded by separate single-screw extruders at a resin temperature of 240° C., and the molten resins were discharged through a side-by-side type composite nozzle (number of holes: 1,795 holes) at a rate of 0.5 g/min per single hole in a mass ratio of the first component to the second component of 70/30.

The fibers obtained by spinning were deposited at a temperature of 30° C. and a cabin pressure of 5,000 Pa on a net surface moving at a line speed of 156 m/min. The fiber bundles thus deposited on the net surface were embossed with an embossing roll (embossing area ratio: 12%, engraved shape: circle) heated at 121° C. and an S-roll heated at 127° C. at a line pressure of 50 N/mm, and the resultant crimped nonwoven fabric with a basis weight of 20 g/m² was wound up around a take-up roll.

The resultant crimped nonwoven fabric was measured and evaluated in the same manner as in Example 3-1. The results are shown in Table 3.

Example 3-3

(Preparation of First Component)

10% by mass of the propylene-based polymer (1) obtained in Production Example 1, 88% by mass of the propylene-based polymer (6), and 2% by mass of an erucamide master batch prepared by mixing 90% by mass of "Prime Polypro™ S119" (trade name, manufactured by Primer Polymer Co., Ltd., MFR: 60 g/10 min) and 10% by mass of erucamide (2,000 ppm by mass, based on the olefin-based resin composition (I), of erucamide was added) were mixed to prepare an olefin-based resin composition (I).

(Preparation of Second Component)

98% by mass of the propylene-based polymer (8), as the propylene-based polymer (ii), and 2% by mass of an erucamide master batch prepared by mixing 90% by mass of "Prime Polypro™ S119" (trade name, manufactured by Primer Polymer Co., Ltd., MFR: 60 g/10 min) and 10% by mass of erucamide (2,000 ppm by mass, based on the olefin-based resin composition (II), of erucamide was added) were mixed to prepare an olefin-based resin composition (II).

(Production of Side-By-Side Type Crimped Nonwoven Fabric)

A crimped nonwoven fabric was produced and evaluated in the same manner as in the production method for the crimped nonwoven fabric of Example 3-2, except that, in the production method for the crimped nonwoven fabric in Example 3-2, the cabin pressure was changed to 2,800 Pa and the line speed on the net surface was changed to 140 m/min. The results are shown in Table 3.

Comparative Example 3-1

(Preparation of First Component)

78% by mass of the propylene-based polymer (4), 20% by mass of the propylene-based polymer (7) and 2% by mass of an erucamide master batch prepared by mixing 90% by mass of "Prime Polypro™ S119" (trade name, manufactured by Primer Polymer Co., Ltd., MFR: 60 g/10 min) and 10% by mass of erucamide (2,000 ppm by mass, based on the olefin-based resin composition (I), of erucamide was added) were mixed to prepare an olefin-based resin composition (I).

(Preparation of Second Component)

An olefin resin-based composition (II) was prepared in the same manner as that of the preparation method for the second component in Example 3-1.

(Production of Side-By-Side Type Crimped Nonwoven Fabric)

A crimped nonwoven fabric was produced in the same manner as in the production method for the crimped nonwoven fabric of Example 3-1, and evaluated in the same manner. The results are shown in Table 3.

"Prime Polypro™ S119" (trade name, manufactured by Primer Polymer Co., Ltd., MFR: 60 g/10 min) and 10% by mass of erucamide (2,000 ppm by mass, based on the olefin-based resin composition (I), of erucamide was added) were mixed to prepare an olefin-based resin composition (I).

(Preparation of Second Component)

100% by mass of the propylene-based polymer (4) was the olefin-based resin composition (II).

(Production of Side-By-Side Type Crimped Nonwoven Fabric)

The first component and the second component were independently melt-extruded at a resin temperature of 240° C., using separate single-screw extruders, and the molten resins were ejected through a side-by-side type composite nozzle (number of holes, 1,795 holes) having a nozzle diameter of 0.6 mm, at a speed of 0.50 g/min/hole in such a manner that the ratio of the first component to the second component could be 70/30, and thus spun.

The fibers obtained through the spinning were, while cooled with air at a temperature of 12.5° C. and at a wind

TABLE 3

| | | | | Unit | Example 3-1 | Example 3-2 | Example 3-3 | Comparative Example 3-1 |
|---|---|---|---|---|---|---|---|---|
| Olefin-based resin composition | First component | Composition | Propylene-based polymer (4) *1 | Mass % | 78 | 0 | 0 | 78 |
| | | | Propylene-based polymer (5) *2 | Mass % | 0 | 78 | 0 | 0 |
| | | | Propylene-based polymer (6) *3 | Mass % | 0 | 0 | 88 | 0 |
| | | | Propylene-based polymer (1) | Mass % | 20 | 20 | 10 | 0 |
| | | | Propylene-based polymer (7) *4 | Mass % | 0 | 0 | 0 | 20 |
| | | | Erucamide master batch *5 | Mass % | 2 | 2 | 2 | 2 |
| | | Physical properties | Total MFR | g/10 min | 71 | 81 | 85 | 64 |
| | | | Melting endothermic amount ΔH-D | J/g | 76 | 80 | 74 | 97 |
| | Second component | Composition | Propylene-based polymer (4) *1 | Mass % | 98 | 0 | 0 | 98 |
| | | | Propylene-based polymer (8) *6 | Mass % | 0 | 98 | 98 | 0 |
| | | | Erucamide master batch *5 | Mass % | 2 | 2 | 2 | 2 |
| | | Physical properties | Total MFR | g/10 min | 30 | 27 | 27 | 30 |
| Fiber constitution | | | First component/second component | Weight ratio | 70/30 | 70/30 | 70/30 | 70/30 |
| | | | Content of olefin-based polymer (1) relative to whole fiber | Mass % | 14 | 14 | 7 | 0 |
| Extrusion molding condition | | | Molten resin temperature | ° C. | 240 | 240 | 240 | 240 |
| | | | Extrusion amount per single hole of first component | g/min/hole | 0.25 | 0.35 | 0.35 | 0.25 |
| | | | Extrusion amount per single hole of second component | g/min/hole | 0.11 | 0.15 | 0.15 | 0.11 |
| Spinning condition | | | Cooling air temperature | ° C. | 12.5 | 30 | 30 | 12.5 |
| | | | Cooling air speed | m/sec | 0.6 | n.d. *8 | n.d. *8 | 0.6 |
| | | | Ejector pressure | kg/cm² | 2.0 | n.d. *8 | n.d. *8 | 2.0 |
| | | | Cabin pressure | Pa | n.d. *8 | 5000 | 2800 | n.d. *8 |
| Line condition | | | Calendaring temperature *7 | ° C./° C. | 50/50 | 121/127 | 121/127 | 50/50 |
| | | | Nip pressure | N/mm | 40 | 50 | 50 | 40 |
| | | | Line speed | m/min | 53 | 156 | 140 | 53 |
| | | | Thread breakage | time/min | 0 | 0 | 0 | 0 |
| Physical properties of nonwoven fabric | | | Basis weight | gsm | 20 | 20 | 20 | 20 |
| | | | Fineness | denier | 1.2 | 1.4 | 1.8 | 1.3 |
| | | | Number of crimps | number/25 mm | 20 | n.d. *8 | n.d. *8 | 27.7 |
| | | | Bulkiness | mm | 245 | n.d. *8 | n.d. *8 | 266 |
| | | | Uniformity | | 3.6 | 2.3 | 2.6 | 3.9 |

*1: propylene-based polymer (4): NOVATEC SA03; MFR 30 g/10 min
*2: propylene-based polymer (5): PP 3155; MFR 35 g/10 min
*3: propylene-based polymer (6): Prime Polypro™ S119; MFR 60 g/10 min
*4: propylene-based polymer (7): Moplen HP461Y; MFR 1,300 g/10 min
*5: composition of erucamide master batch: Prime Polypro™ S119 = 90 mass %, erucamide = 10 mass %
*6: propylene-based polymer (8): HG475; MFR 27 g/10 min
*7: left-side value/right-side value = emboss roll temperature/S-roll temperature
*8: n.d. = immeasurable, or unmeasured.

Example 3-4

(Preparation of First Component)

20% by mass of the propylene-based polymer (1) obtained in Production Example 1, 78% by mass of the propylene-based polymer (4), and 2% by mass of an erucamide master batch prepared by mixing 90% by mass of speed of 0.6 m/sec, suctioned with an ejector arranged at 1,400 mm below the nozzle, under an ejector pressure of 1.5 kg/cm², and were thus deposited on the net surface moving at a line speed of 75 m/min at 255 mm below the nozzle.

The fiber bundles deposited on the net surface were embossed with an embossing roll heated at 70° C. under a linear pressure of 40 N/mm, and the crimped nonwoven fabric having a basis weight of 15 g/m² wound up with a take-up roll.
(Production of Melt-Blown Nonwoven Fabric)

A melt-blown nonwoven fabric apparatus including a single-screw extruder, a die (nozzle, hole diameter: 0.15 mm, number of holes: 720), a high-temperature compressed air generator, a net conveyer, and a winder was used. The polypropylene polymer (7) was melted at a resin temperature of 260° C., and the molted resin was ejected through the die at a speed of 0.1 g/min/single hole. The resin was deposited on a net conveyor surface moving at a line speed of 24 m/min at a flow rate of 360 Nm³/hr, using compressed air at 270° C., and the resultant melt-blown nonwoven fabric having a basis weight of 5 g/m² was wound with the winder.
(Production of Multilayer Nonwoven Fabric)

The crimped nonwoven fabric and the melt-blown nonwoven fabric were layered and the layered nonwoven fabrics were embossed with an embossing roll (embossing area ratio: 16%, engraved shape: diamond shape) heated at 70° C. under a linear pressure of 40 N/mm, and the resultant multilayer nonwoven fabric having a basis weight of 20 g/m² was wound with a winder.

The basis weight of each of the resultant crimped nonwoven fabric, melt-blown nonwoven fabric and multilayer nonwoven fabric was measured according to the above-mentioned measurement method. In addition, regarding the multilayer nonwoven fabric, the formation uniformity of the nonwoven fabric was determined and evaluated according to the above-mentioned evaluation method. The results are shown in Table 4.

Example 3-5

(Preparation of First Component)

40% by mass of the propylene-based polymer (1) obtained in Production Example 1, 56% by mass of the propylene-based polymer (5), and 4% by mass of an erucamide master batch prepared by mixing 95% by mass of "Y6005GM" (trade name, manufactured by Primer Polymer Co., Ltd., MFR: 60 g/10 min) and 5% by mass of erucamide (2,000 ppm by mass, based on the olefin-based resin composition (I), of erucamide was added) were mixed to prepare an olefin-based resin composition (I).

(Preparation of Second Component)

96% by mass of the propylene-based polymer (9), as the propylene-based polymer (ii), and 4% by mass of an erucamide master batch prepared by mixing 95% by mass of "Y6005GM" (trade name, manufactured by Primer Polymer Co., Ltd., MFR: 60 g/10 min) and 5% by mass of erucamide (2,000 ppm by mass, based on the olefin-based resin composition (II), of erucamide was added) were mixed to prepare an olefin-based resin composition (II).
(Production of Side-By-Side Type Crimped Nonwoven Fabric)

The formation of a nonwoven fabric was performed using a spunbond machine (REICOFIL 4, manufactured by Reicofil GmbH). The first component and the second component were spun in such a manner that the components were independently melt extruded by separate single-screw extruders at a resin temperature of 250° C., and the molten resins discharged through a side-by-side type composite nozzle (number of holes: 1,795 holes) at a rate of 0.50 g/min per single hole in a ratio of the first component to the second component of 70/30.

The fibers obtained by spinning were deposited at a temperature of 20° C. and a cabin pressure of 3,000 Pa on a net surface moving at a line speed of 167 m/min. The fiber bundles thus deposited on the net surface were embossed with an embossing roll (embossing area ratio: 12%, engraved shape: circle) heated at 115° C. and an S-roll heated at 113° C. at a line pressure of 50 N/mm, and the resultant crimped nonwoven fabric with a basis weight of 15 g/m² was wound up around a take-up roll.
(Production of Melt-Blown Nonwoven Fabric)

Produced according to the same method as in Example 3-4.
(Production of Multilayer Nonwoven Fabric)

Produced according to the same method as in Example 3-4.

The basis weight of each of the resultant crimped nonwoven fabric, melt-blown nonwoven fabric and multilayer nonwoven fabric was measured according to the above-mentioned measurement method. In addition, regarding the multilayer nonwoven fabric, the formation uniformity of the nonwoven fabric was determined and evaluated according to the above-mentioned evaluation method. The results are shown in Table 4.

TABLE 4

| | | | | | Unit | Example 3-4 | Example 3-5 |
|---|---|---|---|---|---|---|---|
| Layered nonwoven fabric (crimped nonwoven fabric/melt-blown nonwoven fabric) | Crimped nonwoven fabric | First component | Composition | Propylene-based polymer (4) *1 | Mass % | 78 | 0 |
| | | | | Propylene-based polymer (5) *2 | Mass % | 0 | 56 |
| | | | | Propylene-based polymer (1) | Mass % | 20 | 40 |
| | | | | Erucamide master batch *3 | Mass % | 2 | 4 |
| | | | Physical properties | Total MFR | g/10 min | 71 | 183 |
| | | | | Melting endothermic amount ΔH-D | J/g | 76 | 55 |
| | | Second component | Composition | Propylene-based polymer (4) *1 | Mass % | 100 | 0 |
| | | | | Propylene-based polymer (9) *4 | Mass % | 0 | 96 |
| | | | | Erucamide master batch *3 | Mass % | 0 | 4 |
| | | | Physical properties | Total MFR | g/10 min | 30 | 28 |
| | | First component/second component | | | Weight ratio | 70/30 | 70/30 |
| | | Content of propylene-based polymer (1) relative to whole fibers | | | Mass % | 14 | 28 |
| | | Molten resin temperature | | | ° C. | 240 | 250 |
| | | Single hole ejection amount (first component) | | | g/min/hole | 0.35 | 0.35 |
| | | Single hole ejection amount (second component) | | | g/min/hole | 0.15 | 0.15 |
| | | Cooling air temperature | | | ° C. | 12.5 | 20 |
| | | Cooling air speed | | | m/sec | 0.6 | n.d. *6 |
| | | Ejector pressure | | | kg/cm² | 1.5 | n.d. *6 |

TABLE 4-continued

|  |  | Unit | Example 3-4 | Example 3-5 |
|---|---|---|---|---|
|  | Cabin pressure | Pa | n.d. *6 | 3000 |
|  | Calendering temperature *5 | ° C./° C. | 70/70 | 115/113 |
|  | Nip pressure | N/mm | 40 | 50 |
|  | Line speed | m/min | 75 | 167 |
| Layering condition | Layering method | — | Off-line | Off-line |
|  | Calendering temperature *5 | ° C./° C. | 70/70 | 70/70 |
|  | Nip pressure | N/mm | 40 | 40 |
| Properties of multilayer nonwoven fabric | Basis weight (gsm) | Whole weight | 20 | 20 |
|  |  | Crimped nonwoven fabric | 15 | 15 |
|  |  | Melt-blown nonwoven fabric | 5 | 5 |
|  | Uniformity |  | 1.7 | 1.7 |

*1: propylene-based polymer (4): NOVATEC SA03; MFR 30 g/10 min
*2: propylene-based polymer (5): PP 3155; MFR 35 g/10 min
*3: composition of erucamide master batch
    At 2 mass % addition: Prime PolyproTMS119 = 90 mass %, erucamide = 10 mass %
    At 4 mass % addition: Y6005GM = 95 mass %, erucamide = 5 mass %
*4: propylene-based polymer (9): HG455FB; MFR 27 g/10 min
*5: left-side value/right-side value = emboss roll temperature/S-roll temperature
*6: n.d. = immeasurable, or unmeasured.

INDUSTRIAL APPLICABILITY

The spunbond nonwoven fabric of the first aspect of the invention, the spunbond nonwoven fabric of the second aspect of the invention and the nonwoven fabric formed of composite fibers of the third aspect of the invention each are independently excellent in formation uniformity, and are therefore favorably used for various fiber products such as disposable diapers, sanitary products, hygienic products, clothing materials, bandages, packing materials, etc.

In addition, according to the production method for spunbond nonwoven fabrics of the second aspect of the invention, a spunbond nonwoven fabric having uniform texture and excellent in feeling can be obtained with maintaining stable melt moldability and spinnability.

Further, in the case where the nonwoven fabric formed of composite fibers of the third aspect of the invention is a nonwoven fabric formed of crimped fibers, the nonwoven fabric is formed of fibers having strong crimping performance using a polyolefin material without post treatment such as stretching or heating, and the nonwoven fabric is bulky and have good feeling, and is therefore useful for production of filters and wipers.

The invention claimed is:

1. A spunbond nonwoven fabric formed of an olefin-based resin composition (I) comprising a propylene-based polymer (i) satisfying the following requirements (a) and (b):
    (a) the melt flow rate of the propylene-based polymer (i), as measured under the condition of a temperature of 230° C. and a load of 21.18 N, is 1,000 g/10 min or more; and
    (b) the melting endothermic amount ΔH-D, as measured from the melting endothermic curve drawn by keeping the propylene-based polymer (i) at −10° C. in a nitrogen atmosphere for 5 minutes and then heating it at 10° C/min in a nitrogen atmosphere using a differential scanning calorimeter, is less than 80 J/g.
    wherein:
    the olefin-based resin composition (I) satisfies the following requirement (1) and (2):
    (1) the melt flow rate of the olefin-based resin composition (I), as measured under the condition of a temperature of 230° C. and a load of 21.18 N, is 40 g/10 min or more,
    (2) the melting endothermic amount ΔH-D, as measured from the melting endothermic curve drawn by keeping the olefin-based resin composition (I) at −10° C. in a nitrogen atmosphere for 5 minutes and then heating it at 10° C./min in a nitrogen atmosphere using a differential scanning calorimeter, is less than 90 J/g; and
    the spunbond nonwoven fabric has a uniformity of formation of 3.0 or less.

2. The spunbond nonwoven fabric according to claim 1, wherein the melt flow rate of the olefin-based resin composition (I), as measured under the condition of a temperature of 230° C. and a load of 21.18 N, is 45 g/10 min or more.

3. The spunbond nonwoven fabric according to claim 1, wherein the melting endothermic amount ΔH-D of the olefin-based resin composition (I), as measured from the melting endothermic curve drawn by keeping the olefin-based resin composition (I) at −10° C. in a nitrogen atmosphere for 5 minutes and then heating it at 10 ° C./min in a nitrogen atmosphere using a differential scanning calorimeter, is 86 J/g or less.

4. The spunbond nonwoven fabric according to claim 1, wherein the content of the propylene-based polymer (i) in the olefin-based resin composition (I) is 1 to 50% by mass relative to the total amount, 100% by mass of the olefin-based resin composition (I).

5. The spunbond nonwoven fabric according to claim 1, wherein the propylene-based polymer (i) further satisfies the following requirements (c) and (d):
    (c) the mesopentad fraction [mmmm] thereof is 20 to 60 mol%; and
    (d) the racemic pentad fraction [rrrr]/(1-the mesopentad fraction [mmmm])≤0.1.

6. A multilayer nonwoven fabric formed by layering two or more nonwoven fabric layers, wherein at least one nonwoven fabric layer constituting the multilayer nonwoven fabric is the spunbond nonwoven fabric of claim 1.

7. A method for producing a spunbond nonwoven fabric, comprising melt-extruding an olefin-based resin composition (I) containing a propylene-based polymer (i) satisfying the following requirements (a) and (b) at a resin temperature of 220° C. or lower:
    (a) the melt flow rate of the propylene-based polymer (i), as measured under the condition of a temperature of 230° C. and a load of 21.18 N, is 1,000 g/10 min or more;

(b) the melting endothermic amount ΔH-D, as measured from the melting endothermic curve drawn by keeping the propylene-based polymer (i) at −10° C. in a nitrogen atmosphere for 5 minutes and then heating it at 10° C/min in a nitrogen atmosphere using a differential scanning calorimeter, is less than 80 J/g, wherein: the olefin-based resin composition (I) satisfies the following requirement (1):

(1) the melt flow rate of the olefin-based resin composition (I), as measured under the condition of a temperature of 230° C. and a load of 21.18 N, is 40 g/10 min or more.

8. A fiber product using the spunbond nonwoven fabric of claim 1.

9. A fiber product comprising the multilayer nonwoven fabric of claim 6.

* * * * *